(12) United States Patent
Kwon et al.

(10) Patent No.: US 10,236,476 B2
(45) Date of Patent: Mar. 19, 2019

(54) FLEXIBLE ELECTROCHEMICAL DEVICE INCLUDING ELECTRODE ASSEMBLY

(71) Applicant: Samsung Electronics Co., Ltd., Suwon-si, Gyeonggi-do (KR)

(72) Inventors: Moonseok Kwon, Hwaseong-si (KR); Jaeman Choi, Seongnam-si (KR); Euncheol Do, Seoul (KR); Jaejun Chang, Seoul (KR); Yeonji Chung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 202 days.

(21) Appl. No.: 14/864,071

(22) Filed: Sep. 24, 2015

(65) Prior Publication Data
US 2016/0093838 A1 Mar. 31, 2016

(30) Foreign Application Priority Data

Sep. 25, 2014 (KR) ........................ 10-2014-0128282

(51) Int. Cl.
*H01M 2/02* (2006.01)

(52) U.S. Cl.
CPC ...... *H01M 2/02* (2013.01); *H01M 2002/0205* (2013.01)

(58) Field of Classification Search
CPC .......... H01M 2/02; H01M 2002/0205; H01M 2/0275; H01M 2220/30
See application file for complete search history.

(56) References Cited

U.S. PATENT DOCUMENTS

| | | | | |
|---|---|---|---|---|
| 2,798,895 A | * | 7/1957 | Nowotny | ............. H01G 13/006 429/153 |
| 2009/0023057 A1 | * | 1/2009 | Kim | ................... H01M 2/0207 429/120 |
| 2013/0171490 A1 | * | 7/2013 | Rothkopf | ............ H01M 2/0207 429/120 |
| 2013/0323563 A1 | * | 12/2013 | Eo | ........................... H01M 2/30 429/120 |
| 2015/0072218 A1 | * | 3/2015 | Yi | ....................... H01M 2/0275 429/158 |
| 2016/0099454 A1 | | 4/2016 | Kwon et al. | |

FOREIGN PATENT DOCUMENTS

| | | | | |
|---|---|---|---|---|
| JP | 2004-039274 | * | 2/2004 | ............. H01M 2/26 |
| JP | 2004039274 A | | 2/2004 | |
| JP | 2004355917 A | | 12/2004 | |
| KR | 1020110065923 A | | 6/2011 | |

* cited by examiner

*Primary Examiner* — Jonathan Crepeau
*Assistant Examiner* — Angela J Martin
(74) *Attorney, Agent, or Firm* — Cantor Colburn LLP

(57) ABSTRACT

An electrochemical device includes a plurality of electrode assemblies arranged spaced apart from each other in a same direction and a casing member which packages the electrode assemblies, in which the casing member includes a plurality of accommodation portions which accommodates the electrode assemblies, respectively, and a connecting portion which connects between two adjacent accommodation portions, a thickness of the connecting portion is less than a thickness of the accommodation portions, and the connecting portion is bent defining a curved bending portion.

22 Claims, 17 Drawing Sheets

FLEXIBLE ELECTROCHEMICAL DEVICE INCLUDING ELECTRODE ASSEMBLY

RELATED APPLICATION

This application claims priority to Korean Patent Application No. 10-2014-0128282, filed on Sep. 25, 2014, and all the benefits accruing therefrom under 35 U.S.C. § 119, the contents of which in their entireties are herein incorporated by reference.

BACKGROUND

1. Field

The disclosure relates to an electrochemical device including electrode assemblies, and more particularly, to a flexible electrochemical device capable of being repeatedly bent by connecting a plurality of electrode assemblies.

2. Description of the Related Art

Unlike a primary battery which may not be recharged, a secondary battery is an electrochemical device capable of being charged, discharged and recharged, and is widely used in high-tech electronic devices, such as cellular phones, notebook computers, and camcorders.

A lithium secondary battery typically has a higher voltage and a higher energy density per weight than a nickel-cadmium battery or a nickel-hydrogen battery that is commonly used as a power supply for portable electronic equipment, and thus, the demand for the lithium secondary battery has increased in recent. The lithium secondary battery mainly uses lithium-based oxide for a positive electrode active material layer and a carbon material for a negative electrode active material layer. Generally, a lithium secondary battery type may be classified as one of a liquid electrolyte battery and a polyelectrolyte battery, according to a type of electrolyte. The battery using a liquid electrolyte may be referred to as a lithium ion battery, and the battery using a polyelectrolyte may be referred to as a lithium polymer battery. Also, the lithium secondary battery may have various shapes, e.g., a cylindrical shape, a square shape, and a pouch shape. Commonly, a jelly-roll type electrode assembly or a stacked electrode assembly is generally used in the lithium secondary battery. In the jelly-roll type electrode assembly, a separator is inserted between a positive electrode plate and a negative electrode plate, and the separator, the positive electrode plate and the negative electrode plate are wound into a spiral shape. In the stacked electrode assembly, a positive electrode plate and a negative electrode plate are repeatedly stacked and a separator is inserted between the positive electrode plate and the negative electrode plate.

Recently, as demand for a flexible electronic device capable of being flexibly bent has increased, research into manufacturing a flexible battery which may be used in flexible electronic devices has been increasingly conducted.

SUMMARY

Exemplary embodiments of the invention are directed to a flexible electrochemical device capable of being repeatedly bent by connecting a plurality of electrode assemblies.

According to an exemplary embodiment of the invention, an electrochemical device includes: a first electrode assembly; a second electrode assembly spaced apart from the first electrode assembly; a casing member which packages the first and second electrode assemblies and including first and second accommodation portions which accommodate the first and second electrode assemblies, respectively, and a connecting portion which connects between the first and second accommodation portions; and electrolytes disposed in the first and second accommodation portions, where a thickness of the connecting portion is less than a thickness of the first and second accommodation portions, and the connecting portion is bent defining a curved bending portion.

In an exemplary embodiment, the casing member may include a lower casing member disposed at a bottom surface of the first and second electrode assemblies, and an upper casing member disposed above the first and second electrode assemblies, where the lower casing member and the upper casing member may collectively define the first accommodation portion, the second accommodation portion and the connecting portion.

In an exemplary embodiment, an inner space may be defined in the connecting portion, and the inner space is defined by a portion of the lower casing member and a portion of the upper casing member, which collectively define the connecting portion, such that the electrolytes are transported between the first and second accommodation portions.

In an exemplary embodiment, the lower casing member and the upper casing member may be integrally formed as a single unitary.

In an exemplary embodiment, at least one of the lower casing member and the upper casing member may include a being portion bent in the connecting portion such that the lower casing member and the upper casing member are bent independently from each other in the connecting portion.

In an exemplary embodiment, the electrochemical device may further include a sealing member which seals an inner portion of the connecting portion such that the electrolytes respectively disposed in the first and second accommodation portions are isolated from each other.

In an exemplary embodiment, the electrochemical device may further include a conductive line which electrically connects the first and second electrode assemblies, where the conductive line extends between the first and second accommodation portions through an inner space of the connecting portion, and is bent in the connecting portion to have substantially the same shape as the curved bending portion of the connecting portion.

In an exemplary embodiment, the connecting portion may be connected between a bottom region of a side surface of the first accommodation portion and a bottom region of a side surface of the second accommodation portion, where the side surface of the first accommodation portion faces the side surface of the second accommodation portion.

In an exemplary embodiment, the curved bending portion may include a first bent portion bent in a way such that the connecting portion faces the first side surface of the first accommodation portion, a second bent portion bent in a way such that the connecting portion faces the second side surface of the second accommodation portion, and a ridge portion connected between the first bent portion and the second bent portion, where a center of curvature of the first and second bent portions is on an opposite side to a center of curvature of the ridge portion.

In an exemplary embodiment, a highest surface of the connecting portion that faces the center of curvature of the ridge portion may be higher than a lowest surface of the connecting portion that faces the center of curvature of the first and second bent portions.

In an exemplary embodiment, the electrochemical device may further include at least one of a first fixing member and a second fixing member, where the first fixing member is disposed between the first accommodation portion and the first bent portion and fixes the first bent portion to the side surface of the first accommodation portion, and the second fixing member is disposed between the second accommodation portion and the second bent portion and fixes the second bent portion to the side surface of the second accommodation portion.

In an exemplary embodiment, the electrochemical device may further include a fixing member which is fixed to support an inside surface of the ridge portion, where the inside surface of the ridge portion faces the center of curvature of the ridge portion.

In an exemplary embodiment, the ridge portion may be bent in a way such that the ridge portion protrudes above upper surfaces of the first and second accommodation portions to face at least a portion of the upper surface of the first accommodation portion or at least a portion of the upper surface of the second accommodation portion.

In an exemplary embodiment, the curved bending portion may be formed to protrude downwards from lower surfaces of the first and second accommodation portions.

In an exemplary embodiment, the curved bending portion may include a first bent portion bent in a way such that the connecting portion faces the first side surface of the first accommodation portion, a second bent portion bent in a way such that the connecting portion faces the second side surface of the second accommodation portion, a plurality of ridge portions defined between the first bent portion and the second bent portion, and a valley portion defined between the at least two ridge portions.

In an exemplary embodiment, the connecting portion may be connected between a bottom region of a side surface of the first accommodation portion and a top region of a first side surface of the second accommodation portion, where the side surface of the first accommodation portion faces the first side surface of the second accommodation portion.

In an exemplary embodiment, the electrochemical device may further include a third electrode assembly spaced apart from the second electrode assembly, where the casing member may further include a third accommodation portion which accommodates the third electrode assembly, the connecting portion connects between a top region of a second side surface of the second accommodation portion and a bottom region of a side surface of the third accommodation portion, where the second side surface of the second accommodation portion faces the side surface of the third accommodation portion.

In an exemplary embodiment, the electrochemical device may further include a conductive line which electrically connects the first and second electrode assemblies, where the conductive line extends between the first and second accommodation portions through an inner space of the connecting portion and is disposed to face a bottom surface of the first and second electrode assemblies in the casing member.

In an exemplary embodiment, the electrochemical device may further include a conductive line which electrically connects the first and second electrode assemblies, where the conductive line extends between the first and second accommodation portions through an inner space of the connecting portion and is disposed to face a bottom surface of the first electrode assembly and a top surface of the second electrode assembly in the casing member.

In an exemplary embodiment, the curved bending portion may be bent a plurality of times in a serpentine shape in a region between upper surfaces of the first and second accommodation portions and lower surfaces of the first and second accommodation portions.

In an exemplary embodiment, a length of the connecting portion may be 1.5 times greater than a straight line distance between the first accommodation portion and the second accommodation portion.

In an exemplary embodiment, a space surrounding the curved bending portion may be divided into a first space and a second space, which are on opposite sides to each other with respect to the curved bending portion. In such an embodiment, a center of curvature of each point on the curved bending portion may be located in any one of a direction of the first space and a direction of the second space, and the curved bending portion may have a bending direction conversion point at which a location of the center of curvature is changed from the direction of the first space to the direction of the second space, or from the direction of the second space to the direction of the first space.

In an exemplary embodiment, the curved bending portion may have a plurality of bending direction conversion points such that the curved bending portion is bent a plurality of times In an exemplary embodiment, a curved surface may be defined on at least one of an upper surface of the first accommodation portion, a lower surface of the first accommodation portion, an upper surface of the second accommodation portion and a lower surface of the second accommodation portion.

In an exemplary embodiment, the connecting portion may be bent in a way such that the first accommodation portion and the second accommodation portion are inclined with respect to each other.

BRIEF DESCRIPTION OF THE DRAWINGS

These and/or other features will become apparent and more readily appreciated from the following description of the exemplary embodiments, taken in conjunction with the accompanying drawings, in which.

DETAILED DESCRIPTION

Figure 1:
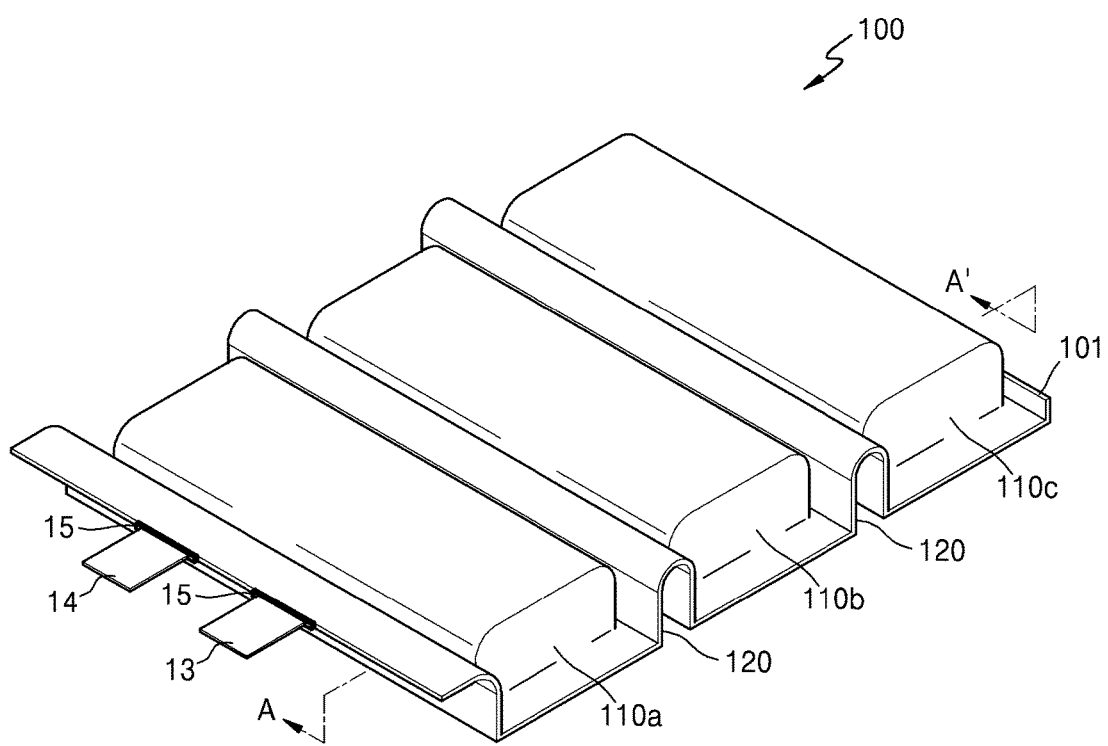
FIG. 1 is a perspective view showing a structure of an exemplary embodiment of an electrochemical device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
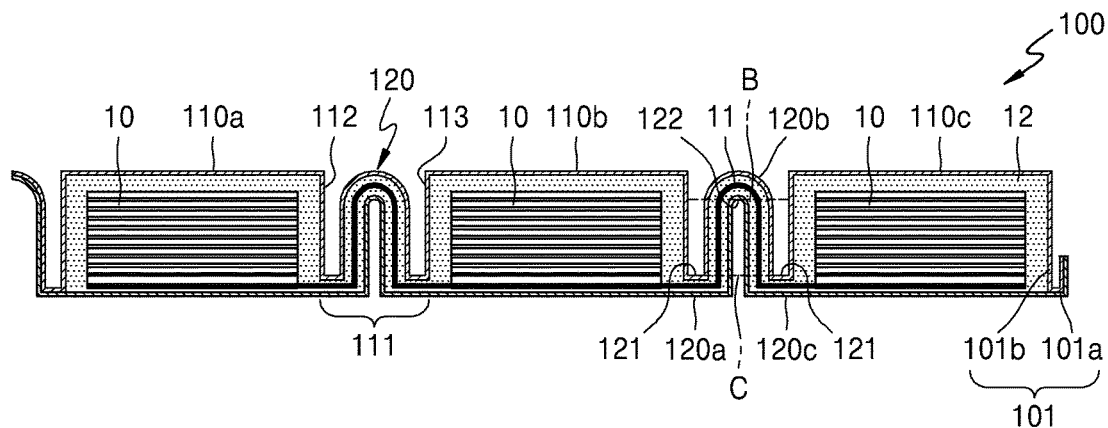
FIG. 2 is a cross-sectional view taken along line A-A' of FIG. 1.

FIG. 1 is a perspective view showing a structure of an exemplary embodiment of an electrochemical device 100 according to the invention. FIG. 2 is a cross-sectional view taken along line A-A' of FIG. 1. Referring to FIGS. 1 and 2, an exemplary embodiment of the electrochemical device 100 may include a plurality of electrode assemblies 10 arranged spaced apart from one another along a direction and a casing member 101 for packaging the plurality of electrode assemblies 10. The casing member 101 may include a plurality of accommodation portions 110a, 110b and 110c that accommodates the plurality of electrode assemblies 10, respectively, and a connecting portion 111 that connects between an adjacent pair of the plurality of accommodation portions 110a, 110b, and 110c. In an exemplary embodiment, the electrochemical device 100 may further include electrolytes 12, which are disposed in the accommodation portions 110a, 110b and 110c, respectively, along with the plurality of electrode assemblies 10. The electrolyte 12 may be disposed not only in the accommodation portions 110a, 110b and 110c, but also in the connecting portion 111. In an exemplary embodiment, as shown in FIGS. 1 and 2, the electrochemical device 100 includes three accommodation portions 110a, 110b and 110c, but not being limited thereto. In one alternative exemplary embodiment, for example, the electrochemical device 100 may include just two accommodation portions 110a and 110b, or may include four or more accommodation portions 110a, 110b and 110c.

The casing member 101 may include a lower casing member 101a and an upper casing member 101b. As illustrated in FIG. 2, the plurality of accommodation portions 110a, 110b and 110c may be defined by the upper casing member 101b, and the lower casing member 101a may have an approximately flat shape. In one exemplary embodiment, for example, the lower casing member 101a may define a bottom surface of the plurality of electrode assemblies 10, and the upper casing member 101b having a curved shape to match a shape of the plurality of accommodation portions 110a, 110b, and 110c and a shape of the connecting portion 111 may be disposed above the lower casing member 101a. Thus, in such an embodiment, the upper casing member 101b may surround other surfaces of the plurality of electrode assemblies 10 except the bottom surface. That is, the lower casing member 101a may defined a bottom surface of the accommodation portions 110a, 110b, and 110c, and the upper casing member 101b may defined the other surfaces, e.g., the rest five surfaces, of the accommodation portions 110a, 110b, and 110c. Edges of the lower casing member 101a and edges of the upper casing member 101b may be solidly bonded to each other so that the electrode assemblies 10 and the electrolytes 12 are not exposed to the outside.

The lower casing member 101a and the upper casing member 101b may be integrally formed as a single unitary and indivisible unit or may be bonded to each other after being separately formed. In one exemplary embodiment, for example, where the lower casing member 101a and the upper casing member 101b are integrally formed as a single unitary and indivisible unit, an edge of the upper casing member 101b may be connected to an edge of the lower casing member 101a, and a boundary portion between the lower casing member 101a and the upper casing member 101b may be folded. In such an embodiment, the boundary portion between the lower casing member 101a and the upper casing member 101b may be folded in a way such that the upper casing member 101b covers the plurality of electrode assemblies 10, after the plurality of electrode assemblies 10 are arranged on the lower casing member 101a, to form the electrochemical device 100. Then, the upper casing member 101b may be pressed in a way such that the plurality of accommodation portions 110a, 110b and 110c, and the connecting portion 111 are formed, and then, edges of the rest three surfaces, on which the upper casing member 101b and the lower casing member 101a are bonded to each other, may be bonded. In such an embodiment, the electrolytes 12 may be injected before the upper casing member 101b and the lower casing member 101a are bonded to each other.

In an exemplary embodiment, where the lower casing member 101a and the upper casing member 101b are separately formed, after the plurality of electrode assemblies 10 are arranged on the lower casing member 101a, the plurality of electrode assemblies 10 may be covered by the additional upper casing member 101b. Then, the upper casing member 101b may be pressed in a way such that the plurality of accommodation portions 110a, 110b and 110c, and the connecting portion 111 are formed, and edges of four surfaces, on which the upper casing member 101b and the lower casing member 101a are bonded to each other, may be bonded.

In such an embodiment, when pressing the upper casing member 101b, a press molding frame having the shape of the plurality of accommodation portions 110b, 110b and 110c and the connecting portion 111 may be used, for example. In such an embodiment, a space having a sufficient thickness to accommodate the electrode assemblies 10 and the electrolytes 12 may be provided in the plurality of accommodation portions 110a, 110b, and 110c by using the press molding frame. In such an embodiment, the connecting portion 111 may be formed to have a thickness smaller than the thickness of the plurality of accommodation portions 110a, 110b, and 110c. By forming the connecting portion 111 to have the sufficiently smaller thickness, a bending portion 120, which is curved, may be easily formed in the connecting portion 111, which will be described later. Here, the thickness may be defined as a maximum distance between the upper casing member 101b and the lower casing member 101a. In one exemplary embodiment, for example, the thickness of the accommodation portions 110a, 110b and 110c may be two times greater than the thickness of the connecting portion 111.

In an alternative exemplary embodiment, the upper casing member 101b, in which the shape of the plurality of accommodation portions 110a, 110b and 110c and the connecting portion 111 is defined or formed in advance by molding, may be used instead of pressing the upper casing member 101b.

In an exemplary embodiment, as illustrated in FIGS. 1 and 2, the connecting portion 111 of the electrochemical device 100 is connected between bottom regions of two side surfaces of an adjacent pair of the plurality of accommodation units 110a, 110b and 110c, where the two side surfaces facing each other. In one exemplary embodiment, for example, the connecting portion 111 is connected between the bottom region of a first side surface 112 of the first accommodation unit 110a and the bottom region of a second side surface 113 of the second accommodation unit 110b. Also, the connecting portion 111 may be repeatedly bent to have at least one curved bending portion 120. In one exemplary embodiment, for example, the bending portion 120 may be formed by bending the connecting portion 111 by about 90°, bending it toward an 180° opposite direction, and then bending it again by 90°. Alternatively, the bending portion 120 may be formed by pressing the connecting portion 111 by using an object having a shape of the bending portion 120. In an exemplary embodiment, a thermal, chemical or physical process may be performed on the connecting portion 111 to maintain the shape of the bending portion 120, after the bending portion 120 is formed.

The bending portion 120 may include a first bent portion 120a, a second bent portion 120c and a ridge portion 120b. The first bent portion 120a is a portion of the connecting portion 111, which is bent by about 90° to face the first side surface 112 of the accommodation portions 110a, 110b, and 110c. The second bent portion 120c is a portion of the connecting portion 111, which is bent by about 90° to face the second side surface 113 of the accommodation portions 110a, 110b and 110c. In one exemplary embodiment, for example, a radius of curvature of the first bent portion 120a and the second bent portion 120c may be smaller than about 0.5 millimeters (mm). The ridge portion 120b is connected between the first bent portion 120a and the second bent portion 120c. The ridge portion 120b may be a portion of the connecting portion 111, which is bent by about 180°, while forming a smooth or continuous curved line. Thus, a portion of the connecting portion 111, which is between the first bent portion 120a and the ridge portion 120b, may face the first side surface 112 of the accommodation portions 110a, 110b and 110c. Also, a portion of the connecting portion 111, which is between the second bent portion 120c and the ridge portion 120b, may face the second side surface 113 of the accommodation portions 110a, 110b and 110c.

In an exemplary embodiment, as illustrated in FIG. 2, an apex of an outer surface of the ridge portion 120b is almost or about at the same height as upper surfaces of the accommodation portions 110a, 110b and 110c, but the inventive concept is not limited thereto. In one alternative exemplary embodiment, for example, the apex of the outer surface of the ridge portion 120b may be higher or lower than the upper surfaces of the accommodation portions 110a, 110b, and 110c. In an exemplary embodiment, a height B of a ceiling surface 122 of an inside surface of the ridge portion 120b may be higher than a height C of an inside bottom surface 121 of the first bent portion 120a and the second bent portion 120c, such that the bending portion 120 may be allowed to have a sufficient elastic restoring force. In one exemplary embodiment, For example, the first and second bent portions 120a and 120c may be located substantially close to a bottom portion of the accommodation portions 110a, 110b and 110c, and the ridge portion 120b may be located substantially close to an upper portion of the accommodation portions 110a, 110b, and 110c such that the height B of the ceiling surface 122 of the inside surface of the ridge portion 120b may be sufficiently greater than the height C of the inside bottom surface 121 of the first bent portion 120a and the second bent portion 120c. A length of the connecting portion 111 may be about 1.5 times greater than a straight line distance between an adjacent pair of the plurality of accommodation portions 110a, 110b and 110c, to from such a bending portion 120. In one exemplary embodiment, for example, the length of the connecting portion 111 may be about two times greater than the straight line distance between the adjacent pair of the plurality of accommodation portions 110a, 110b and 110c.

In an exemplary embodiment of the electrochemical device 100 according to the invention, since the bending portion 120 has a sufficient elastic restoring force, strain and stress applied to the connecting portion 111 may be dispersed by the bending portion 120. Thus, in such an embodiment, the reliability and resilience with respect to the bending transformation may be improved. In such an embodiment, since the distance between the plurality of electrode assemblies 10 may be made short, an energy density of the electrochemical device 100 may be increased, as well as the electrochemical device 100 may be flexibly bent. Accordingly, an exemplary embodiment of the electrochemical device 100 may be easily bent, and such an embodiment of the electrochemical device 100 may be effectively applied to any types of electronic devices, and may be applied in realizing flexible electronic devices.

In an exemplary embodiment, the electrochemical device 100 may further include a conductive line 11 that electrically connects the plurality of electrode assemblies 10 and first and second lead tabs 13 and 14 that electrically connect an external electrode terminal to the conductive line 11. In an exemplary embodiment, the conductive line 11 may be defined by a single conductive line illustrated in the cross-sectional view of FIG. 2, but not being limited thereto. In an alternative exemplary embodiment, a plurality of conductive lines, e.g., two conductive lines, may connect the plurality of electrode assemblies 10 in parallel. In one exemplary embodiment, for example, two conductive lines 11 extending long in a direction, in which the plurality of electrode assemblies 10 are arranged, may be arranged in parallel and spaced apart from each other. In one exemplary embodiment, for example, the conductive lines 11 may be a sheet-type conductive line in which a width thereof is greater than a thickness thereof. Each of the conductive lines 11 extends through the inside of the connecting portion 111 to electrically connect the plurality of electrode assemblies 10 arranged respectively in the plurality of accommodation portions 110a, 110b and 110c. Each of the conductive lines 11 may be bent to have substantially the same shape as the shape of the connecting portion 111, in the connecting portion 111.

In an exemplary embodiment, as illustrated in FIG. 2, a portion of a single conductive line 11 extends to the inside of the accommodation portions 110a, 110b and 110c to be arranged adjacent to a surface of the plurality of electrode assemblies 10, and another portion of the single conductive line 11 electrically connects the plurality of electrode assemblies 10. In an alternative exemplary embodiment, a plurality of conductive lines 11 may be used. In one exemplary embodiment, for example, separate conductive lines 11 may be arranged in separate connecting portions 111, respectively, and each of the separate conductive lines 11 may electrically connect two electrode assemblies 10 arranged in an adjacent pair of the plurality of accommodation portions 110a, 110b and 110c.

In an exemplary embodiment, the connecting portion 111 may define a path for the conductive line 11, but also a path for the electrolytes 12. In such an embodiment, a portion of the lower casing member 101a and a portion of the upper casing member 101b, the portions forming the connecting portion 111, may not be bonded to each other, to define a space between the lower casing member 101a and the upper casing member 101b. In such an embodiment of the electrochemical device 10, the electrolytes 12 may be transported to and from the plurality of accommodation portions 110a, 110b and 110c through the connecting portion 111 and reacted with the plurality of electrode assemblies 10. Thus, the plurality of electrode assemblies 10 may have a uniform performance.

In an exemplary embodiment, the first lead tab 13 may be electrically connected to one of the two conductive lines 11, and the second lead tab 14 may be electrically connected to the other of the two conductive lines 11. The first and second lead tabs 13 and 14 and the conductive line 11 may be separately formed and may be connected with one another. Alternatively, ends of the two conductive lines 11 may be extracted to the outside of the electrochemical device 100 to define the first and second lead tabs 13 and 14, respectively. Such first and second lead tabs 13 and 14 may be arranged between the lower casing member 101a and the upper casing member 101b and extracted to the outside through the casing member 101. A sealing member 15 may further be disposed in a middle portion of the first and second lead tabs 13 and 14, to effectively seal a portion between the lower casing member 101a and the upper casing member 101b, in which the first and second lead tabs 13 and 14 are arranged. The sealing member 15 may include or be formed of, for example, a thermoplastic material, such as polypropylene ("PP"). In FIG. 1, an edge of the casing member 101, at which the first and second lead tabs 13 and 14 are arranged, is bent so that the first and second lead tabs 13 and 14 are located at substantially the same height as an upper surface of the accommodation portions 110a, 110b, and 110c. However, the inventive concept is not necessarily limited thereto. In an alternative exemplary embodiment, the height of the first and second lead tabs 13 and 14 may be variously modified according to design choice.

Figure 3:
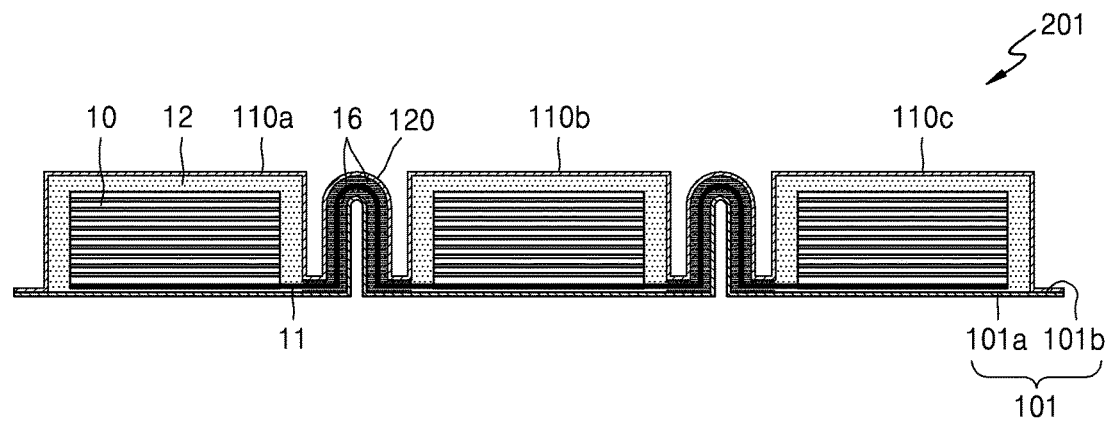
FIG. 3 is a cross-sectional view showing a structure of an alternative exemplary embodiment of an electrochemical device according to the invention.

FIG. 3 is a cross-sectional view showing a structure of an alternative exemplary embodiment of an electrochemical device 201 according to the invention. In an exemplary embodiment, as shown in FIG. 3, the electrochemical device 201 may further include a sealing member 16 disposed inside the connecting portion 111. The sealing member 16 may seal a space between the lower casing member 101a and the conductive line 11 and a space between the upper casing member 101b and the conductive line 11, in the connecting portion 111. The sealing member 16 may include or be formed of a flexible material so that the bending portion 120 of the connecting portion 111 has flexibility. Generally, the flexibility of a material may be defined by a Young's modulus (i.e., a tensile strength) and the flexibility of a sheet may be defined by a Specific Flexure Rigidity (=Et$^3$/12). E is a Young's Modulus and t is the thickness of a sheet. Herein, a material having flexibility means that the material may each independently have a Young's modulus (i.e., a tensile strength) of about 0.01 gigapascal (GPa) to about 300 GPa, e.g., about 0.05 GPa to about 220 GPa.

In an exemplary embodiment, as illustrated in FIG. 3, the sealing member 16 is filled throughout the connecting portion 111, but not being limited thereto. In an alternative exemplary embodiment, the sealing member 16 may be filled in a portion of the connecting portion 111. In such an embodiment, since the connecting portion 111 is completely sealed by the sealing member 16, the electrolytes 12 disposed in the plurality of accommodation portions 110a, 110b and 110c, respectively, may be isolated from one another. In such an embodiment, an interaction between the electrode assembly 10 and the electrolyte 12 may be separately performed in the plurality of accommodation portions 110a, 110b and 110c.

Figure 4A:
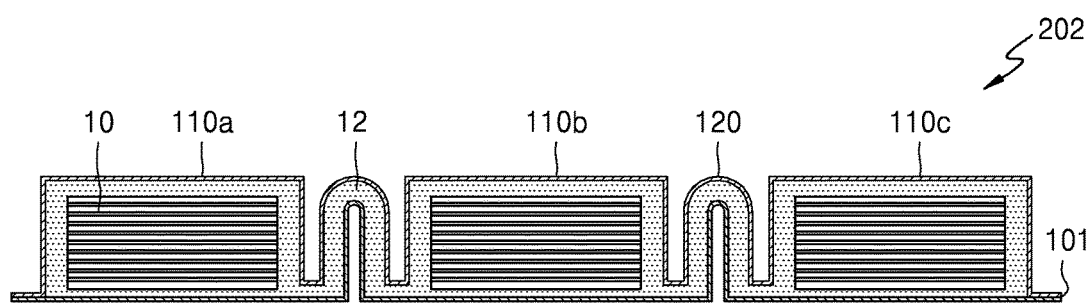
FIGS. 4A and 4B are a cross-sectional view and a perspective view, respectively, showing a structure of an exemplary embodiment of an electrochemical device according to the invention.
Figure 4B:
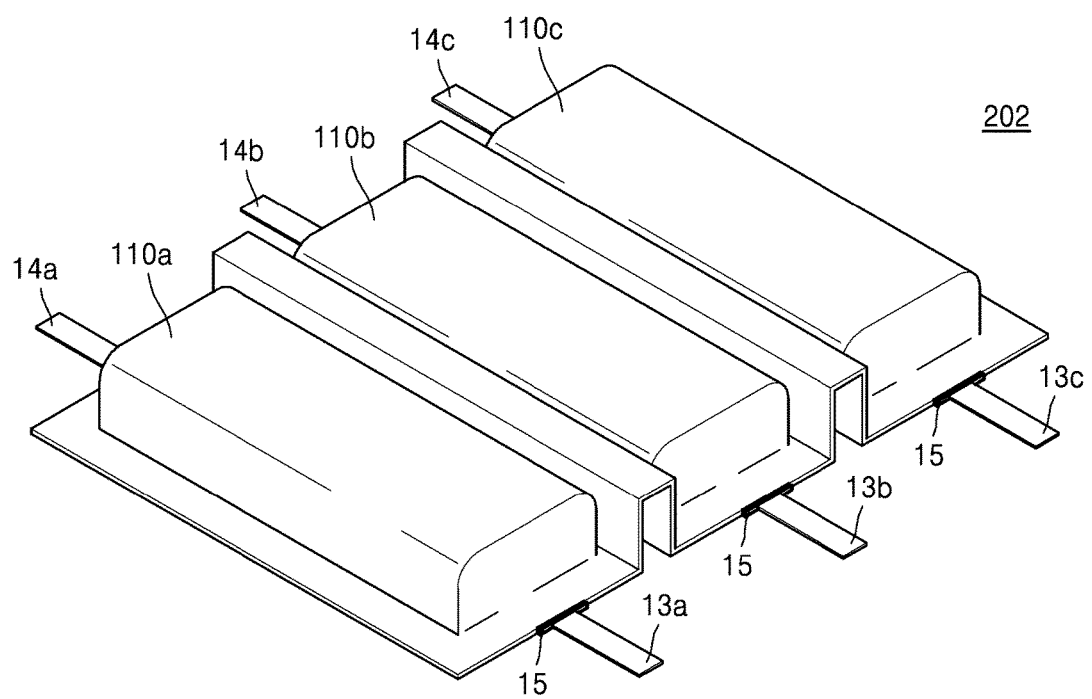

FIGS. 4A and 4B are a cross-sectional view and a perspective view, respectively, showing a structure of another alternative exemplary embodiment of an electrochemical device 202 according to the invention. An exemplary embodiment of the electrochemical device 202 illustrated in FIG. 4A is substantially the same as an exemplary embodiment of the electrochemical device 100 in FIG. 2, except that the conductive line 11 that electrically connects the plurality of electrode assemblies 10 may not be disposed in the casing member 101, and an inner space that connects the plurality of accommodation portions 110a, 110b, and 110c may be defined in the connecting portion 111, to define a path for the electrolyte 12. In such an embodiment, the plurality of electrode assemblies 10 arranged in the plurality of accommodation portions 110a, 110b, and 110c, respectively, may commonly react with one electrolyte 12. In such an embodiment, the electrochemical device 202 may include first lead tabs 13a, 13b and 13c, and second lead tabs 14a, 14b and 14c, respectively disposed in the accommodation portions 110a, 110b and 110c, as illustrated in FIG. 4B, instead of the conductive line 11 for electrically connecting the plurality of electrode assemblies 10. In such an embodiment, the plurality of electrode assemblies 10 may be electrically connected in parallel or in series by connecting an additional external conductive line to the first lead tabs 13a, 13b and 13c, and the second lead tabs 14a, 14b and 14c.

Figure 5:
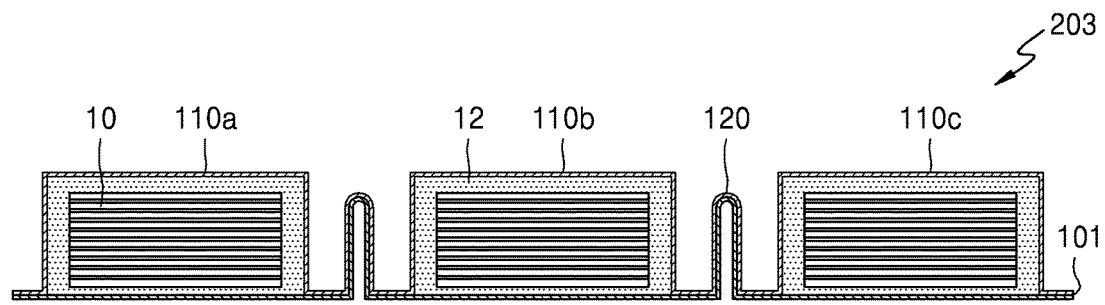
FIG. 5 is a cross-sectional view showing a structure of an alternative exemplary embodiment of an electrochemical device according to the invention.

FIG. 5 is a cross-sectional view showing a structure of another alternative exemplary embodiment of an electrochemical device 203 according to the invention. Referring to FIG. 5, an exemplary embodiment of the electrochemical device 203 may not include the conductive line 11 that electrically connects the plurality of electrode assemblies 10 in the connecting portion 11, and the lower casing member 101a and the upper casing member 101b are bonded to each other in the connecting portion 111. Thus, the connecting portion 111 is sealed, and thus, the electrolytes 12 disposed in the accommodation portions 110a, 110b and 110c, respectively, may be isolated from one another. In such an embodiment, an interaction between the electrode assembly 10 and the electrolyte 12 may be performed separately in the plurality of accommodation portions 110a, 110b and 110c.

The electrochemical device 203 illustrated in FIG. 5 may also include the first lead tabs 13a, 13b and 13c, and the second lead tabs 14a, 14b and 14c, respectively disposed in the accommodation portions 110a, 110b and 110c, as illustrated in FIG. 4B.

In FIG. 5, although the bending portion 120 in the connecting portion 111 is illustrated as substantially the same shape as those in the exemplary embodiments described above with reference to FIGS. 1 through 5, the bending portion 120 may have various shapes. FIGS. 6 through 10 are cross-sectional views showing structures of other alternative exemplary embodiments of the electrochemical device 204 through 208 according to the invention. For convenience of illustration and description, FIGS. 6 through 10 show exemplary embodiments where the electrochemical device 204 through 208 has two accommodation portions 110a and 110b, but not being limited thereto.

Figure 6:
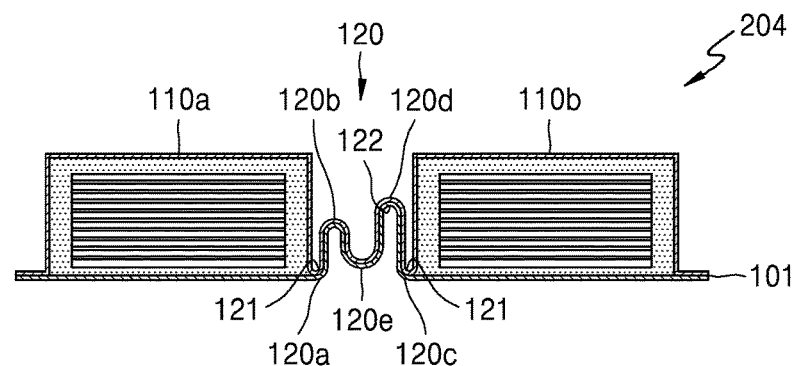
FIGS. 6 to 10 are cross-sectional views showing structures of other alternative exemplary embodiments of an electrochemical device according to the invention.

In an exemplary embodiment, referring to FIG. 6, the electrochemical device 204 may include the bending portion 120 having two ridge portions 120b and 120d. In one exemplary embodiment, for example, the bending portion 120 may include the first ridge portion 120b and the second ridge portion 120d, formed between the first bent portion 120a and the second bent portion 120c, and a valley portion 120e formed between the first ridge portion 120b and the second ridge portion 120d. Heights of the first ridge portion 120b and the second ridge portion 120d may be substantially the same as each other, but not being limited thereto. In an alternative exemplary embodiment, one of the heights of the first ridge portion 120b and the second ridge portion 120d may be greater than the other. In one exemplary embodiment, for example, the height of the second ridge portion 120d is greater than the height of the first ridge portion 120b, as shown in FIG. 6, but not being limited thereto.

In an exemplary embodiment, where the heights of the first ridge portion 120b and the second ridge portion 120d are different, a height of a ceiling surface 122 (e.g., a surface having the greatest height) of the inside surface of the higher ridge portion 120b or 120d may be greater than the height of the inside bottom surface 121 of the first and second bent portions 120a and 120c. In one exemplary embodiment, for example, referring to FIG. 6, the height of the ceiling surface 122 of the inside surface of the second ridge portion 120d may be greater than the height of the inside bottom surface 121 of the first bent portion 120a and the second bent portion 120c. In such an embodiment, a height of the ceiling surface 122 of the inside surface of the lower ridge portion 120b is not limited. In an exemplary embodiment, as illustrated in FIG. 6, when the height of the ceiling surface 122 of the inside surface of the second ridge portion 120d satisfies the above-described condition, the height of the first ridge portion 120b may be freely selected. Although it is illustrated in FIG. 6 that a height of the valley portion 120e is almost similar to a height of the first bent portion 120a and the second bent portion 120c, the height of the valley portion 120e is not limited.

Figure 7:
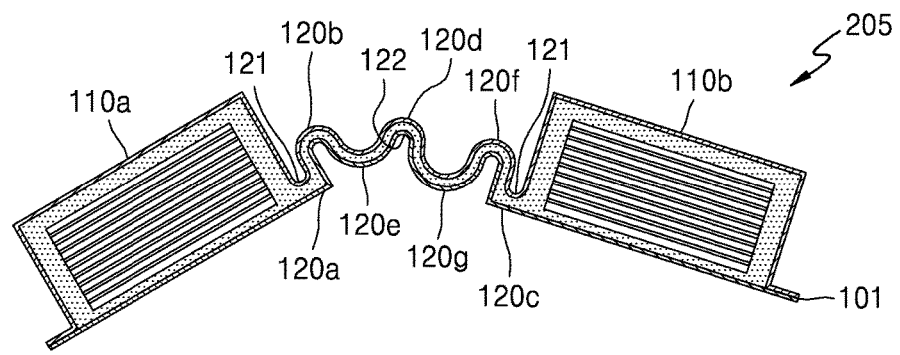

In an exemplary embodiment, the bending portion 120 may include three or more ridge portions. In one exemplary embodiment, for example, FIG. 7 is a cross-sectional view showing a structure of another alternative exemplary embodiment of an electrochemical device 205 according to the invention. Referring to FIG. 7, an exemplary embodiment of the electrochemical device 205 may include the bending portion 120 having three ridge portions 120b, 120d and 120f. In one exemplary embodiment, for example, the bending portion 120 may include the first through third ridge portions 120b, 120d and 120f formed between the first bent portion 120a and the second bent portion 120c, and first and second valley portions 120e and 120g formed between the first and second ridge portions 120b and 120d and between the second and third ridge portions 120d and 120f, respectively. Heights of the first through third ridge portions 120b, 120d and 120f may be substantially the same as or different from each other. Heights of the first and second valley portions 120e and 120g may be substantially the same as or different from each other.

In an exemplary embodiment, where the heights of the first through third ridge portions 120b, 120d, and 120f are different from each other, a height of the ceiling surface 122 of the inside surface of the highest ridge portion may be greater than a height of the inside bottom surface 121 of the first bent portion 120a and the second bent portion 120c. In one exemplary embodiment, for example, as illustrated in FIG. 7, a height of the ceiling surface 122 of the inside surface of the second ridge portion 120d may be greater than the height of the inside bottom surface 121 of the first and second bent portions 120a and 120c. When the height of the ceiling surface 122 of the inside surface of the second ridge portion 120d satisfies the above-described condition, the height of the first and third ridge portions 120b and 120f may be freely selected.

Figure 8:
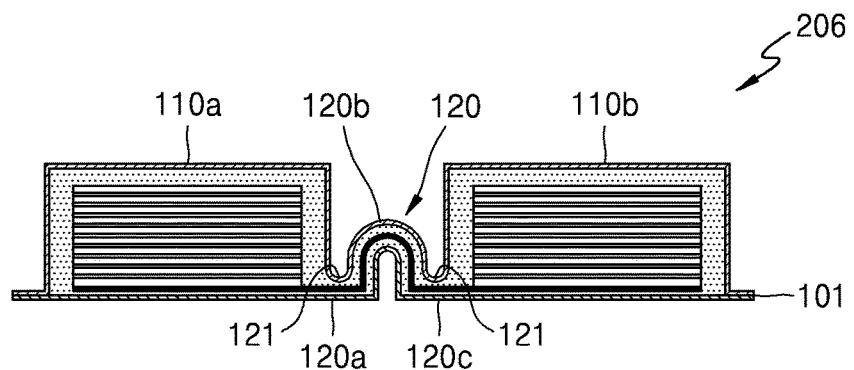

FIG. 8 is a cross-sectional view showing a structure of another alternative exemplary embodiment of an electrochemical device 206 according to the invention. Referring to FIG. 8, the bending portion 120 of the electrochemical device 206 may include one ridge portion 120b. In such an embodiment of the electrochemical device 206 illustrated in FIG. 8, an apex of an outer surface of the ridge portion 120b of the bending portion 120 may be located lower than the upper surface of the accommodation portions 110a and 110b. Even if the ridge portion 120b is lower than the upper surface of the accommodation portions 110a and 110b, a height of the ceiling surface 122 of the inside surface of the ridge portion 120b may be greater than a height of the inside bottom surface 121 of the first bent portion 120a and the second bent portion 120c.

Figure 9:
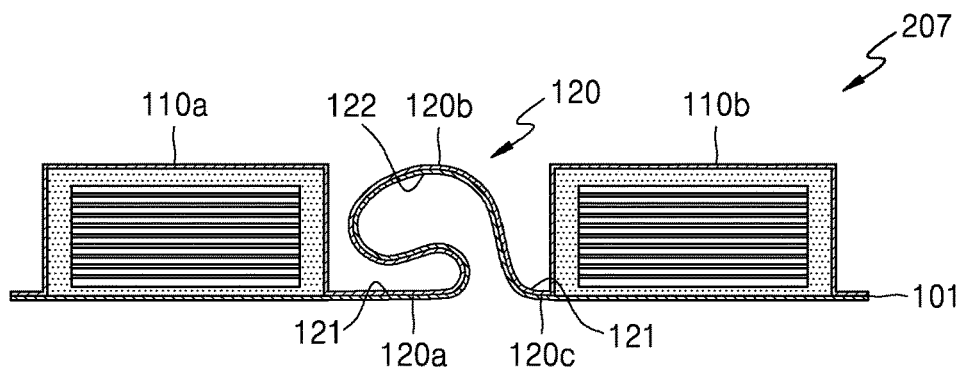

FIG. 9 is a cross-sectional view showing a structure of yet another alternative exemplary embodiment of an electrochemical device 207 according to the invention. Referring to FIG. 9, the bending portion 120 of the electrochemical device 207 may have a freer shape, e.g., an asymmetrical shape. In one exemplary embodiment, for example, the first bent portion 120a and the second bent portion 120c may be asymmetrically located with respect to a central line between two adjacent accommodation portions 110a and 110b. In such an embodiment, a curved line connecting between the first bent portion 120a and the ridge portion 120b and a curved line connecting between the second bent portion 120c and the ridge portion 120b may also be asymmetrically defined with respect to the central line between the two adjacent accommodation portions 110a and 110b. In such an embodiment, as shown in FIG. 9, the first bent portion 120a and the second bent portion 120c may be disposed to be inclined toward the second accommodation portion 11b. In such an embodiment, the curved line connecting between the first bent portion 120a and the ridge portion 120b is greatly bent toward the first accommodation portion 110a, and the curved line connecting between the second bent portion 120c and the ridge portion 120b is relatively less bent. In such an embodiment, the height of the ceiling surface 122 of the inside surface of the ridge portion 120b may be greater than the height of the inside bottom surface 121 of the first bent portion 120a and the second bent portion 120c.

Figure 10:
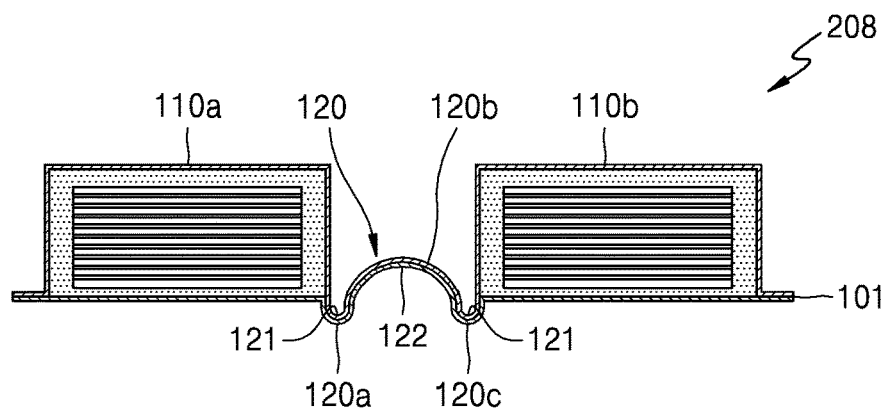

FIG. 10 is a cross-sectional view showing a structure of still another alternative exemplary embodiment of an electrochemical device 208 according to the invention. Referring to FIG. 10, the bending portion 120 of the electrochemical device 208 may include the first bent portion 120a, the second bent portion 120c, and the ridge portion 120b. An exemplary embodiment of the electrochemical device 207 illustrated in FIG. 10 is substantially the same as an exemplary embodiment of the electrochemical device 100 shown in FIG. 1, except that the height of the inside bottom surface 121 of the first bent portion 120a and the second bent portion 120c may be located lower than a lower surface of the plurality of accommodation portions 110a and 110b. In such an embodiment, the height of the ceiling surface 122 of the inside surface of the ridge portion 120b may be greater than the height of the inside bottom surface 121 of the first bent portion 120a and the second bent portion 120c.

Figure 11:
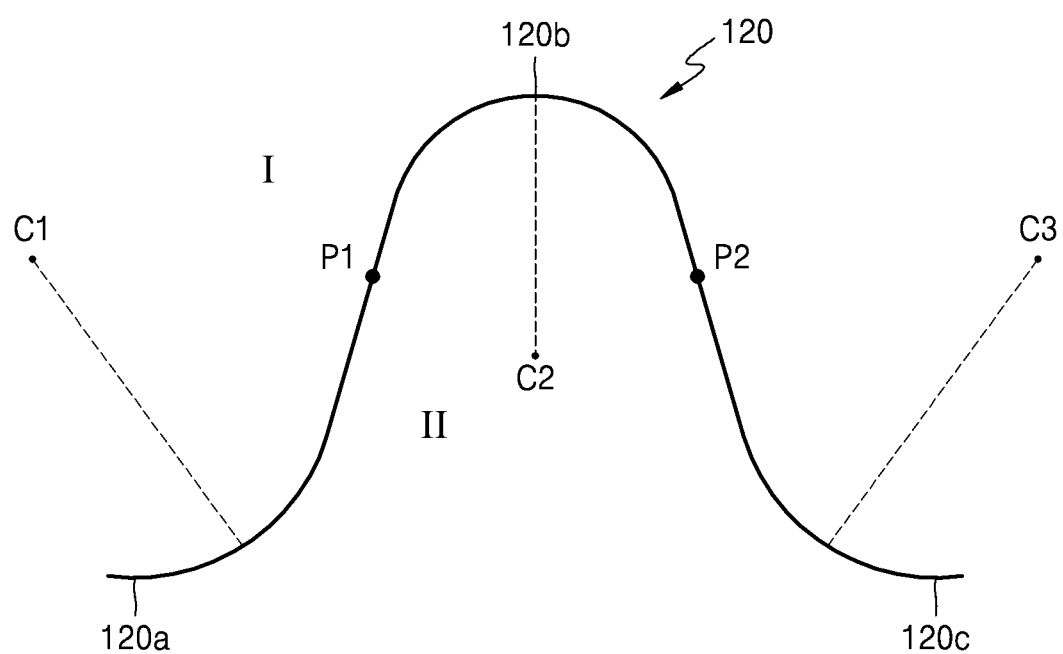
FIG. 11 is a view showing a change in a location of a center of curvature, according to locations of points on a bending portion of an exemplary embodiment of an electrochemical device.

FIG. 11 is a view illustrating a change in a location of a center of curvature according to locations of points on the bending portion 120 of an exemplary embodiment of the electrochemical device. Referring to FIG. 11, a space is divided into two by the bending portion 120. That is, the space may be divided as space I at an upper side of the bending portion 120 and space II at a bottom side of the bending portion 120. Also, a center of curvature C1 of a point on the bending portion 120, which is located in a portion of the first bent portion 120a, is located in a direction of space I. Likewise, a center of curvature C3 of a point on the bending portion 120, which is located in a portion of the second bent portion 120c, is located in the direction of space I. As shown in FIG. 11, a center of curvature C2 of a point on the bending portion 120, which is located in a portion of the ridge portion 120b, is located in a direction of space II which is on the opposite side to space I. Thus, the bending portion 120 has a point thereon, the location of the center of curvature of which, changes from the direction of space I to the direction of space II, and again from the direction of space II to the direction of space I. Hereinafter, these points will be referred to as bending direction conversion points. FIG. 11 illustrates a first bending direction conversion point P1 and a second bending direction conversion point P2 on the bending portion 120. The center of curvature is located in the direction of space I at a left side with respect to the first bending direction conversion point P1, and the center of curvature is located in the direction of space II at a right side with respect to the first bending direction conversion point P1. On the contrary, with respect to the second bending direction conversion point P2, the center of curvature is located in the direction of space II at a left side and the center of curvature is located in the direction of space I at a right side.

To trace an evolute, which is a trace of the center of curvature of each point on a curved line, when a point moves from the first bent portion 120a to the first bending direction conversion point P1, the center of curvature of the point becomes distant from the bending portion 120 toward the direction of space I, and is located at infinity when the point is at the first bending direction conversion point P1. Also, between the first bending direction conversion point P1 and the second bending direction conversion point P2, the center of curvature is located at infinity toward the direction of space II and is closest to the bending portion 120 at an apex of the ridge portion 120b. Also, as it becomes near to the second bending direction conversion point P2, the center of curvature become distant from the bending portion 120 toward the direction of space II and is located at infinity at the second bending direction conversion point P2. Also, when it approaches from the second bending direction conversion point P2 to the portion of the second bent portion 120c, the center of curvature is at infinity toward the direction of space I and gradually becomes near to the bending portion 120. Thus, there are discontinuous portions of the evolute at the first bending direction conversion point P1 and the second bending direction conversion point P2, where the bending direction of the bending portion 120 changes.

Accordingly, if the connecting portion 111 is bent once, the connecting portion 111 has no bending direction conversion point. However, if the connecting portion 111 is bent twice, the connecting portion 111 has one bending direction conversion point between two bent portions. In other words, if the connecting portion 111 has one or more bending direction conversion points, the connecting portion 111 may be bent two or more times. Since the connecting portion 111 may be bent two or more times, an energy density as well as durability and flexibility of the electrochemical devices may be increased.

Considering such a center of curvature, it may be defined that the inside bottom surface 121 of the first bent portion 120a and the second bent portion 120c denotes a lowest surface of the connecting portion 111, which faces the center of curvature of the first bent portion 120a and the second bent portion 120c. Also, it may be defined that the ceiling surface 122 of the inside surface of the ridge portion 120b denotes a highest surface of the connecting portion 111, which faces the center of curvature of the ridge portion 120b.

As shown in FIG. 11, the number of bending direction conversion points may be two, but the inventive concept is not limited thereto. In an exemplary embodiment, the number of bending direction conversion points may vary according to the shape of the bending portion 120. In one exemplary embodiment, for example, the bending portion 120 may have one bending direction conversion point, or three or more bending direction conversion points. FIGS. 12 through 27 are cross-sectional views showing structures exemplary embodiments of an electrochemical device 209 through 224 having various numbers of bending direction conversion points.

Figure 12:
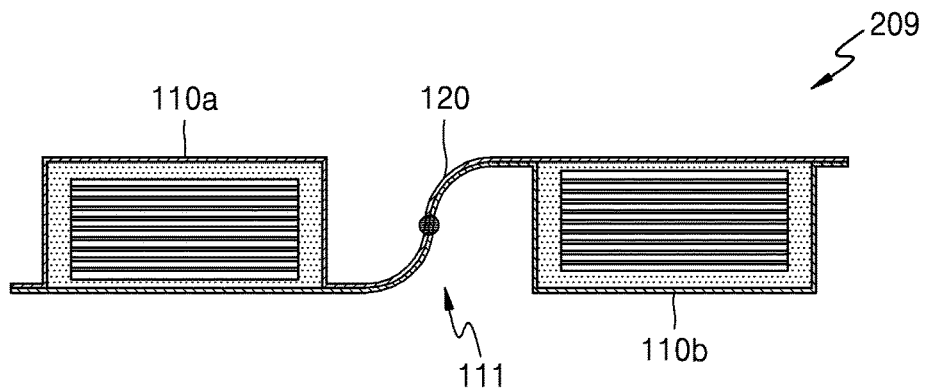
FIGS. 12 through 14 are cross-sectional views showing structures of exemplary embodiments of an electrochemical device including a bending portion having one bending direction conversion point.
Figure 13:
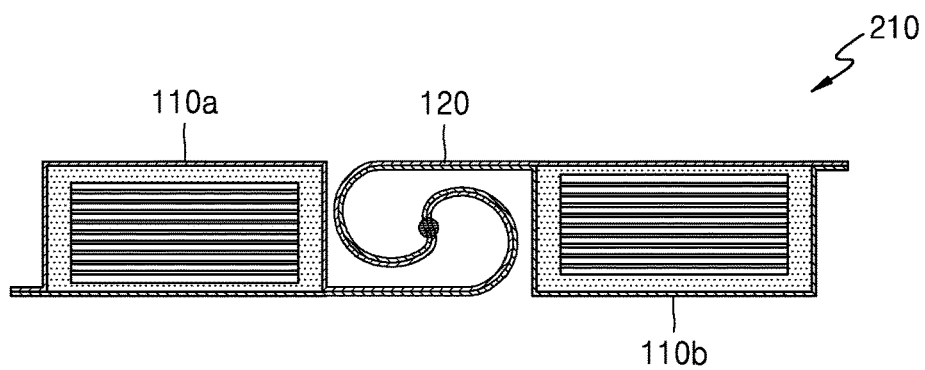
Figure 14:
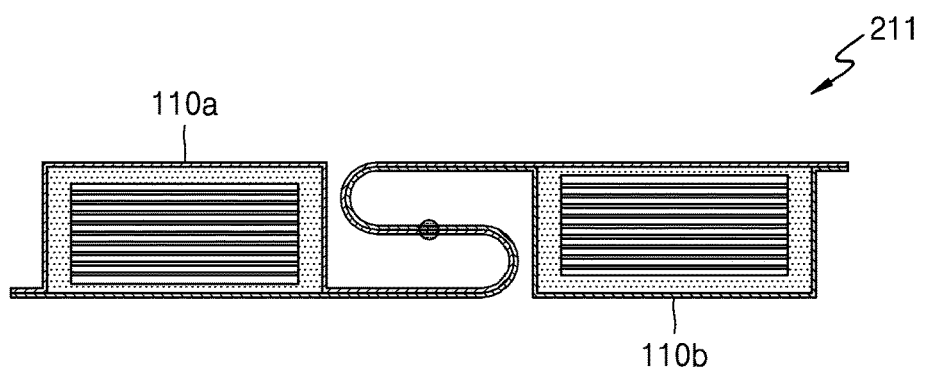
Figure 15:
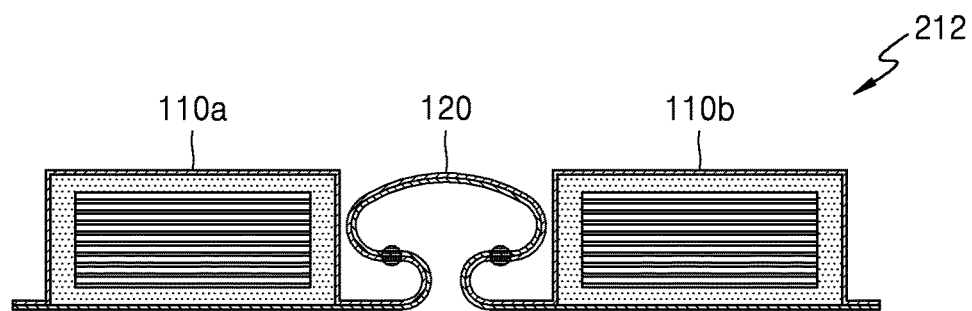
FIGS. 15 through 19 are cross-sectional views showing structures of exemplary embodiments of an electrochemical device including a bending portion having two bending direction conversion points.
Figure 16:
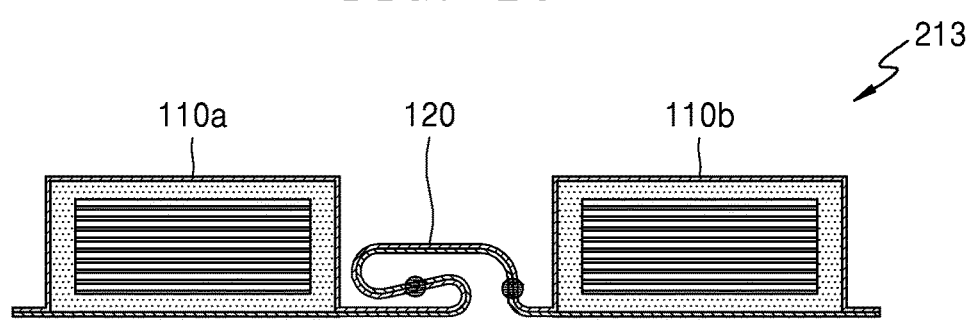
Figure 17:
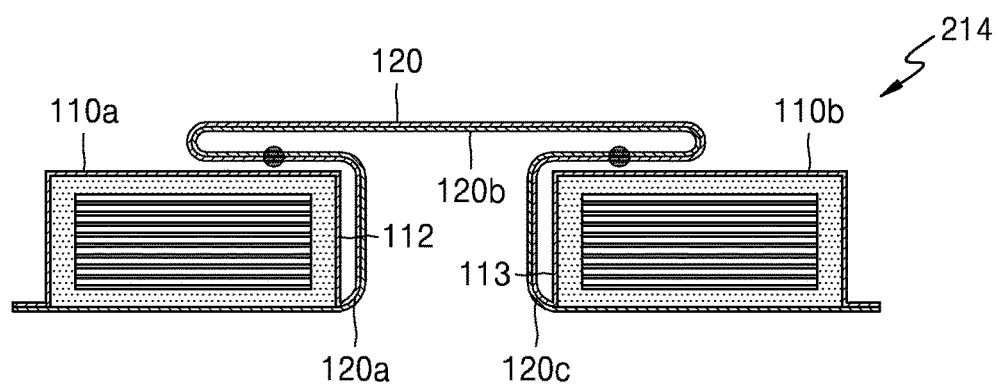
Figure 18:
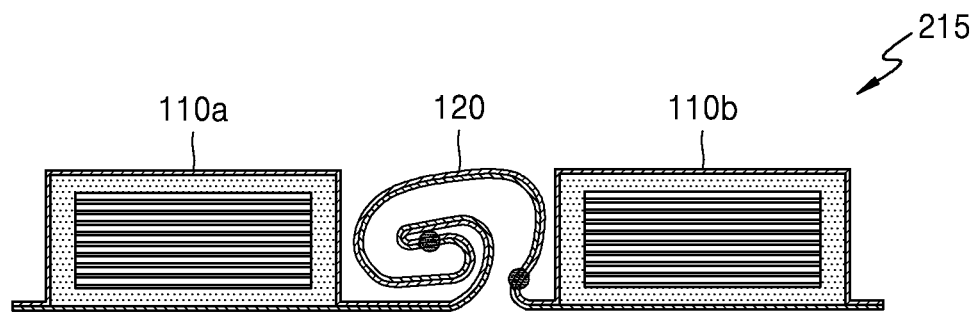
Figure 19:
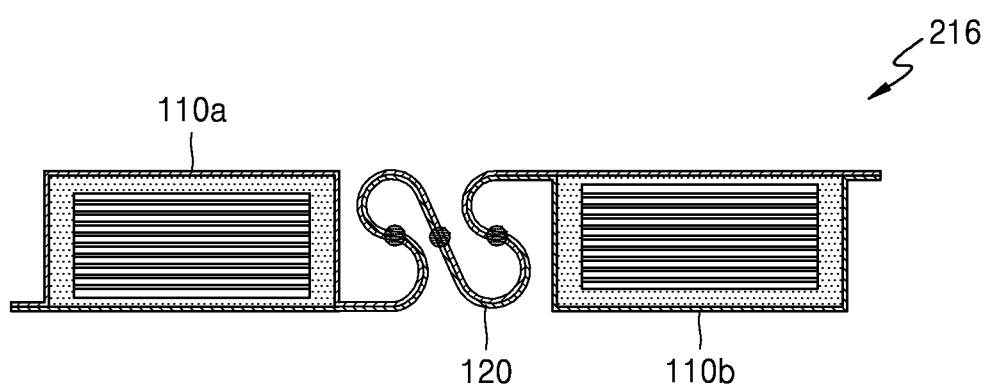

Exemplary embodiments of the electrochemical device 209, 210 and 211, as illustrated in FIGS. 12 through 14, may include the bending portion 120 having one bending direction conversion point. Referring to FIGS. 12 through 14, the connecting portion 111 of exemplary embodiments of the electrochemical device 209, 210 and 211 is connected between a bottom region and a top region of two adjacent accommodation portions 110a and 110b. In one exemplary embodiment, for example, the connecting portion 111 may be connected between the bottom region of the first side surface 112 of the first accommodation portion 110a and the top region of the second side surface 113 of the second accommodation portion 110b. Thus, in such embodiments of the electrochemical device 209, 201 and 211 illustrated in FIGS. 12 through 14, the bending portion 120 may have the ridge portion 120b near the second side surface 113 of the second accommodation portion 110b. In such embodiments, the connecting portion 111 is curved to have the bending portion 120. As illustrated in FIGS. 12 through 14, the bending portion 120 may have curved surfaces of various shapes, and may have one bending direction conversion point near a center thereof.

FIGS. 15 through 19 illustrate exemplary embodiments of an electrochemical device 212, 213, 214, 215 and 216 including the bending portion 120 having two bending direction conversion points. As illustrated in FIGS. 15 through 19, the bending portions 120 having two bending direction conversion points may be realized in various shapes. In an exemplary embodiment of the electrochemical device 214 illustrated in FIG. 17, a portion of the bending portion 120 may extend onto an upper surface of two adjacent accommodation portions 110a and 110b. In one exemplary embodiment, for example, the ridge portion 120b of the bending portion 120 may extend in a way such that the ridge portion 120b of the bending portion 120 protrudes above the upper surface of the first and second accommodation portions 110a and 110b to face at least a portion of the upper surface of the first accommodation portion 110a and at least a portion of the upper surface of the second accommodation portion 110b. Thus, a portion of the bending portion 120, which is between the first bent portion 120a and the ridge portion 120b, is bent to face the first side surface 112 and the upper surface of the first accommodation portion 110a, and a portion of the bending portion 120, which is between the second bent portion 120c and the ridge portion 120b, is bent to face the second side surface 113 and the upper surface of the second accommodation portion 110b. In such an embodiment, two edges of the ridge portion 120b are folded by about 180°, and an apex portion of the ridge portion 120b may be formed substantially flat. In such an embodiment, the two bending direction conversion points may not be located between the two adjacent accommodation portions 110a and 110b and may be located on the upper surfaces of the accommodation portions 110a and 110b, respectively.

Figure 20:
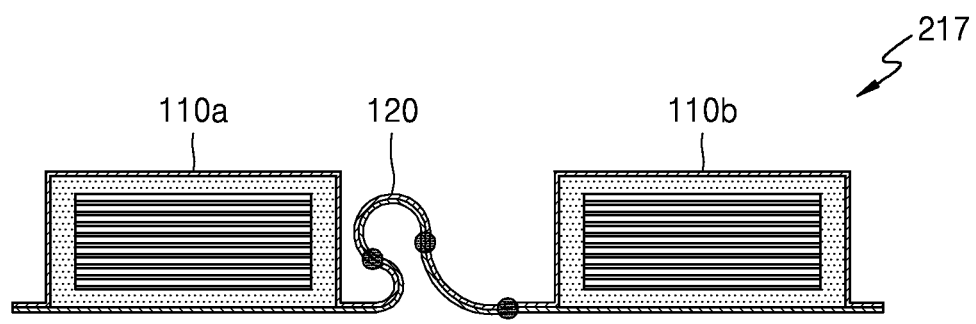
FIGS. 20 and 21 are cross-sectional views showing structures of exemplary embodiments of an electrochemical device including a bending portion having three bending direction conversion points.
Figure 21:
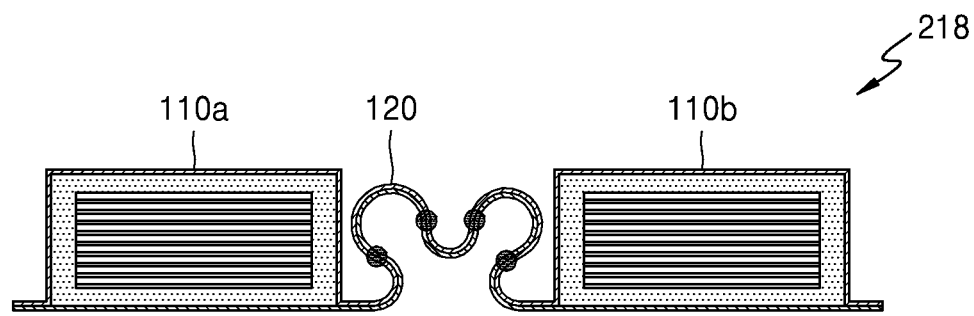
Figure 22:
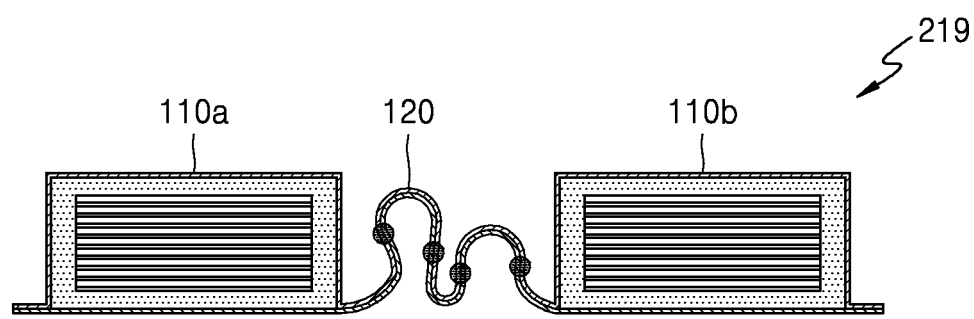
FIGS. 22 through 25 are cross-sectional views showing structure of exemplary embodiments of an electrochemical device including a bending portion having four bending direction conversion points.
Figure 23:
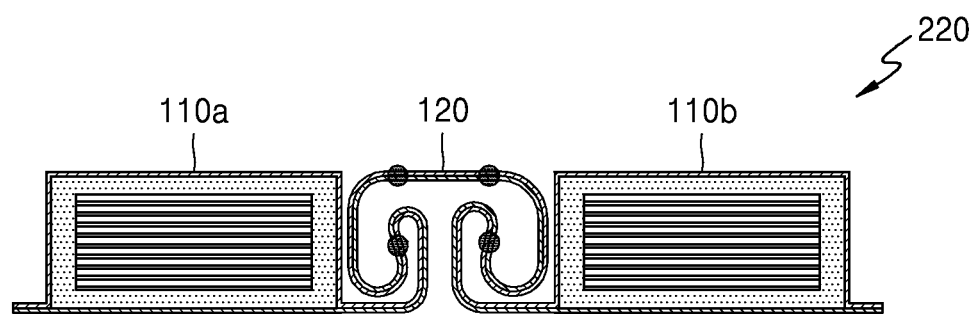
Figure 24:
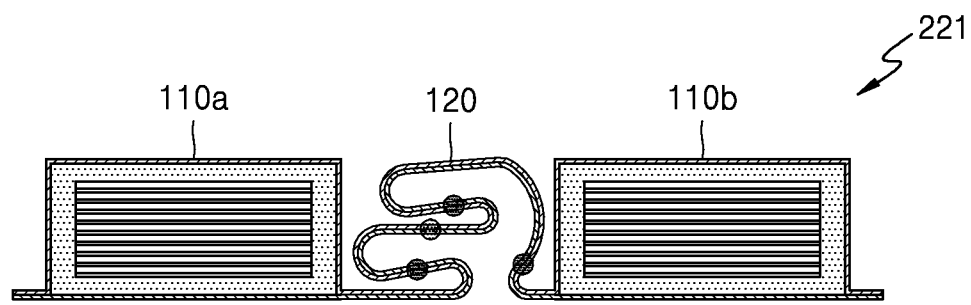
Figure 25:
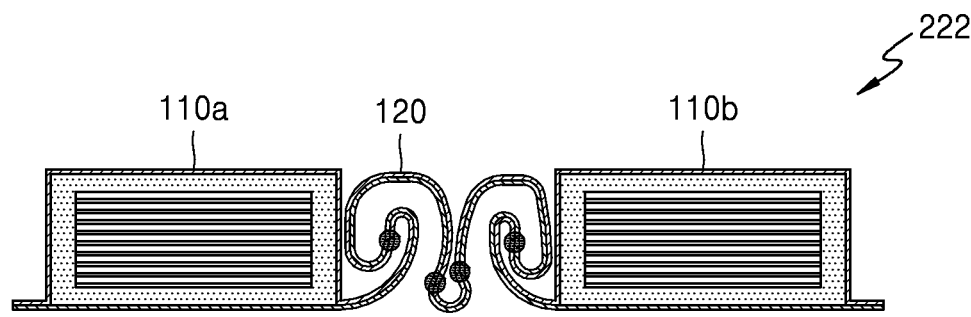
Figure 26:
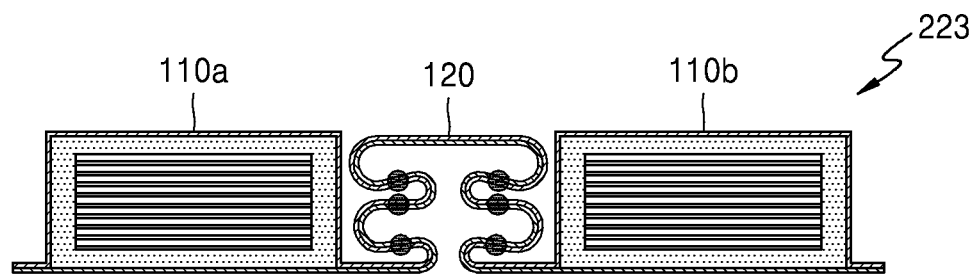
FIGS. 26 and 27 are cross-sectional views showing structures of exemplary embodiments of an electrochemical device including a bending portion having six bending direction conversion points.
Figure 27:
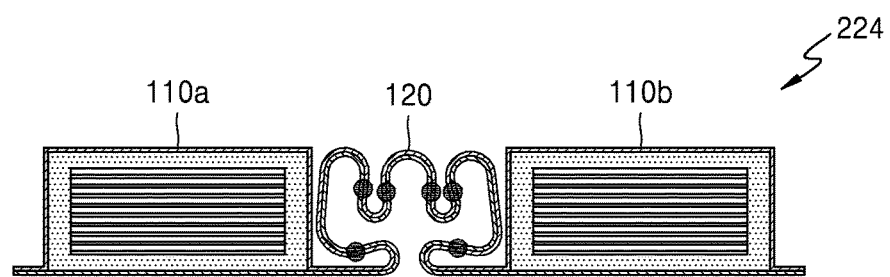

FIGS. 20 and 21 illustrate exemplary embodiments of an electrochemical device 217 and 218 including the bending portion 120 having three bending direction conversion points. FIGS. 22 through 25 illustrate exemplary embodiments of an electrochemical device 219, 220, 221 and 222 including the bending portion 120 having four bending direction conversion points. FIGS. 26 and 27 illustrate exemplary embodiments of an electrochemical device 223 and 224 including the bending portion 120 having six bending direction conversion points. As illustrated in FIGS. 20 through 27, the bending portions 120 having three or more bending direction conversion points may be realized in various shapes. When the bending portions 120 have three or more bending direction conversion points, the bending portion 120 may have a structure repeatedly folded by a plurality number of times.

Figure 28:
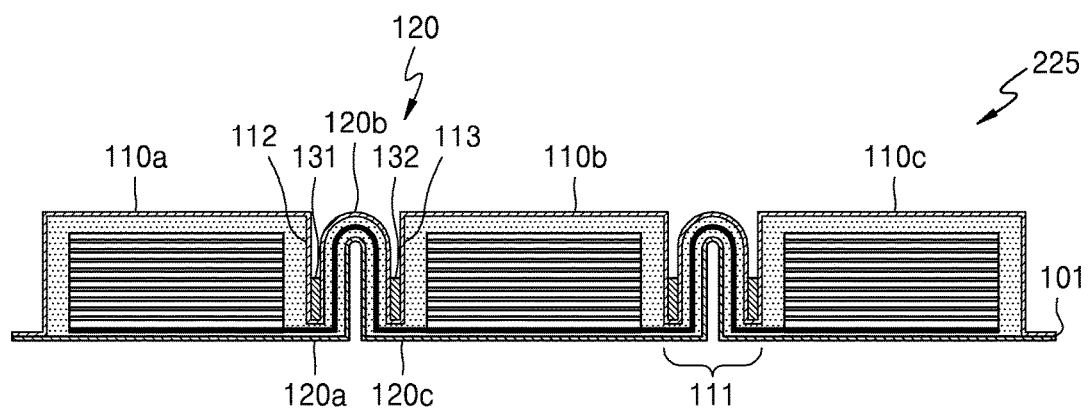
FIGS. 28 through 40 are cross-sectional views showing structures of various exemplary embodiments of an electrochemical device according to the invention.

FIG. 28 is a cross-sectional view showing a structure of another alternative exemplary embodiment of an electrochemical device 225 according to the invention. Referring to FIG. 28, the electrochemical device 225 may include fixing members 131 and 132 that restrict a movement of a portion of the connecting portion 111, which is bent by a small radius of curvature. In one exemplary embodiment, for example, in the connecting portion 111 illustrated in FIG. 28, portions, such as the first bent portion 120a and the second bent portion 120c, which are folded by a small radius of curvature, are vulnerable to repeated bending and thus may be easily fractured. The fixing members 131 and 132 may restrict the movement of the portion of the connecting portion 111, which is bent by a small radius of curvature, and thus may increase the resilience of the electrochemical device 225. The fixing members 131 and 132 may include or be formed of a material having elasticity. In one exemplary embodiment, for example, the fixing members 131 and 132 may include or be formed of a material, such as a bonding agent having elasticity, an adhesive agent, a thermoplastic elastomer, silicon rubber, rubber, leather, and polyurethane.

In one exemplary embodiment, for example, the first fixing member 131 may be disposed between the first accommodation portion 110a and the first bent portion 120a to fix the first bent portion 120a to the first side surface 112 of the first accommodation portion 110a. In such an embodiment, the second fixing member 132 may be disposed between the second accommodation portion 110b and the second bent portion 120c to fix the second bent portion 120c to the second side surface 113 of the second accommodation portion 110b. The movement of the first and second bent portions 120a and 120c is restricted by the first and second fixing members 131 and 132, and thus, the first and second bent portions 120a and 120c may be effectively prevented from being repeatedly bent and fractured. In such an embodiment, the repeated bending may occur only around the ridge portion 120b. When the first and second fixing members 131 and 132 are arranged as shown in FIG. 28, the radius of curvature of the first and second bent portions 120a and 120c may be smaller than about 1 mm.

Figure 29:
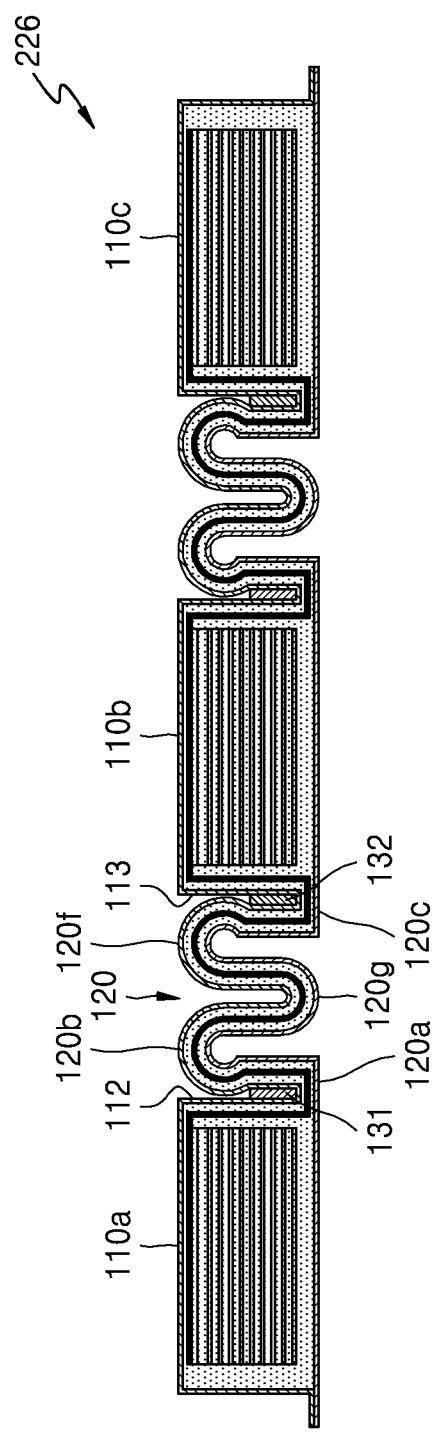

FIG. 29 is a cross-sectional view showing a structure of still another alternative exemplary embodiment of an electrochemical device 226 according to the invention. In such an embodiment of the electrochemical device 226 illustrated in FIG. 29, the bending portion 120 may have a complex shape including the plurality of ridge portions 120b and 120f and the valley portion 120f therebetween. In such an embodiment, the first fixing member 131 that fixes the first bent portion 120a to the first side surface of the first accommodation portion 110a may be disposed between the first accommodation portion 110a and the first bent portion 120a. In such an embodiment, the second fixing member 132 may be disposed between the second accommodation portion 110b and the second bent portion 120c to fix the second bent portion 120c to the second side surface 113 of the second accommodation portion 110b. In FIGS. 28 and 29, exemplary embodiments where the electrochemical device 226 includes both the first and second fixing members 131 and 132, but not being limited thereto. In an alternative exemplary embodiment, the electrochemical device may include only one of the first and second fixing members 131 and 132.

Figure 30:
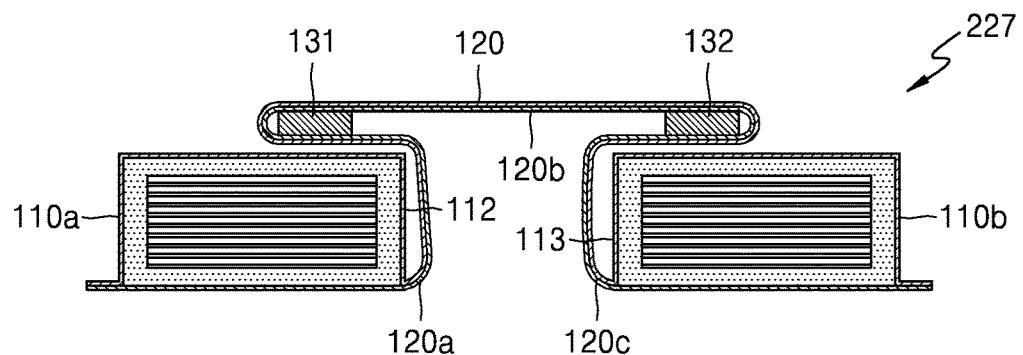

FIG. 30 is a cross-sectional view showing a structure of yet another alternative exemplary embodiment of an electrochemical device 227 according to the invention. As illustrated in FIG. 30, in an exemplary embodiment where two edges of the ridge portion 120b of the bending portion 120 are bent by almost 180° and an apex portion of the ridge portion 120b is formed almost flat, the two edges of the ridge portion 120b may be vulnerable to repeated bending. Thus, in such an embodiment, the first and second fixing members 131 and 132 may be disposed at the two edges of the ridge portion 120b of the bending portion 120, respectively. In one exemplary embodiment, for example, the first fixing member 131 may be disposed to face the upper surface of the first accommodation portion 110a and may be fixed at an edge of the ridge portion 120b, which is bent by about 180°. In such an embodiment, the second fixing member 132 may be disposed to face the upper surface of the second accommodation portion 110b and may be fixed at the other edge of the ridge portion 120b, which is bent by about 180°. Alternatively, only either one of the first fixing member 131 and the second fixing member 132 may be disposed.

Figure 31A:
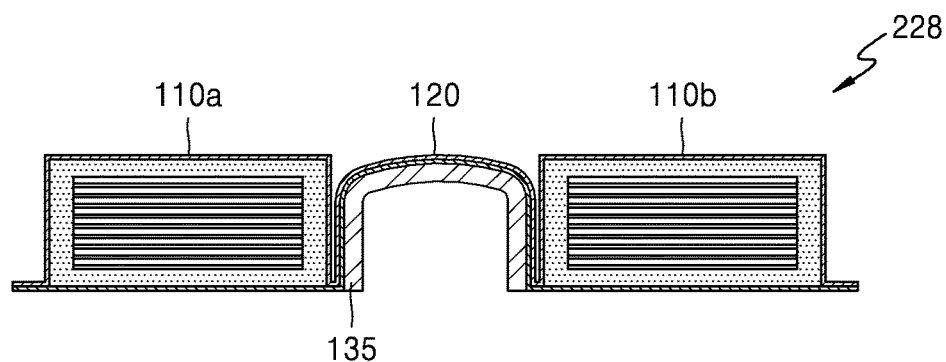

FIG. 31A is a cross-sectional view showing a structure of yet still another alternative exemplary embodiment of an electrochemical device 228 according to another exemplary embodiment. Referring to FIG. 31A, an exemplary embodiment of the electrochemical device 228 may include a fixing member 135 that supports the entire bending portion 120. In one exemplary embodiment, for example, the fixing member 135 may have a horseshoe shape, and may be fixed at an inside surface of the bending portion 120. In such an embodiment, the fixing member 135 may be fixed to support an inside surface of the ridge portion 120b of the bending portion 120. In such an embodiment, the fixing member 135 may be fixed on a surface of the connecting portion 111, which faces the center of curvature of a ridge portion.

Figure 31B:
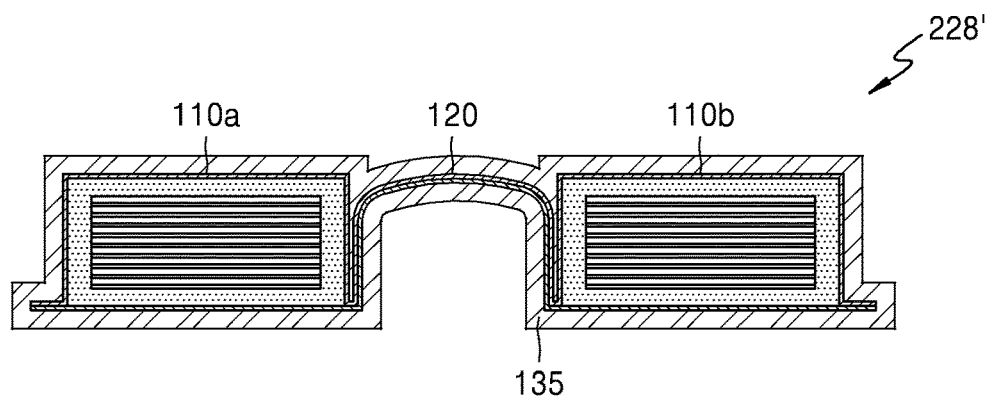

FIG. 31B is a cross-sectional view of a structure of an electrochemical device 228' according to another exemplary embodiment. Referring to FIG. 31B, the fixing member 135 may be further extended such that the fixing member 135 entirely surrounds the electrochemical device 228'.

Figure 32:
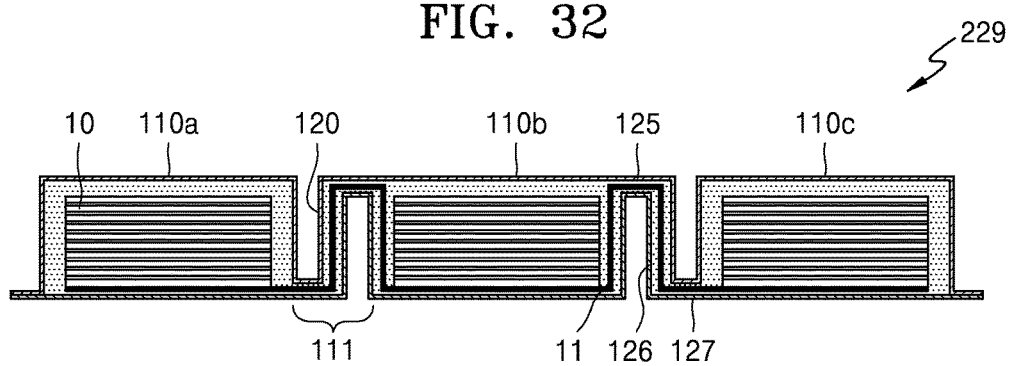

FIG. 32 is a cross-sectional view showing a structure of still another alternative exemplary embodiment of an electrochemical device 229 according to the invention. Referring to FIG. 32, in an exemplary embodiment, the connecting portion 111 of the electrochemical device 229 is connected between the bottom region and the top region of adjacent accommodation portions 110a, 110b and 110c. In one exemplary embodiment, for example, the connecting portion 111 between the first accommodation portion 110a and the second accommodation portion 110b may be connected between the bottom region of the first side surface 112 of the first accommodation portion 110a and the top region of the second side surface 113 of the second accommodation portion 110b. In such an embodiment, the connecting portion 111 between the second accommodation portion 110b and the third accommodation portion 110c may be connected between the top region of the first side surface 112 of the second accommodation portion 110b and the bottom region of the second side surface 113 of the third accommodation portion 110c.

In such an embodiment, the bending portion 120 may be bent almost at a right angle. In one exemplary embodiment, for example, the bending portion 120 may include a first portion 125 extending in a horizontal direction from the top region of the second accommodation portion 110b, a second portion 126 extending in a vertical direction from the first portion 125 by being bent by about 90°, and a third portion 127 extending in a horizontal direction from the second portion 126 by being bent by about 90° toward the bottom region of the first accommodation portion 110a or the third accommodation portion 110c. According to exemplary embodiments of FIG. 32, the first accommodation portion 110a and the third accommodation portion 110c may be formed at the upper casing member 101b, and the second accommodation portion 110b may be formed at the lower casing member 101a.

The conductive lines 11 for electrically connecting the plurality of electrode assemblies 10 may be bent in a way such that the conductive lines 11 are arranged to face bottom surfaces of the plurality of electrode assemblies 10, respectively. In one exemplary embodiment, for example, as illustrated in FIG. 32, the conductive line 11 is bent in the connecting portion 111 between the first accommodation portion 110a and the second accommodation portion 110b, as substantially the same shape as a shape of the bending portion 120 along the connecting portion 111. Thus, the conductive line 11 is lead in the second accommodation portion 110b through the top region of the second accommodation portion 110b. Then, the conductive line 11 may be bent below the electrode assembly 10 in the second accommodation portion 110b. Also, a portion of the conductive line 11 between the second accommodation portion 110b and the third accommodation portion 110c may be bent toward the top region of the second accommodation portion 110b, and then, may be lead in the third accommodation portion 110c through the bottom region of the third accommodation portion 110c along the connecting portion 111.

Figure 33:
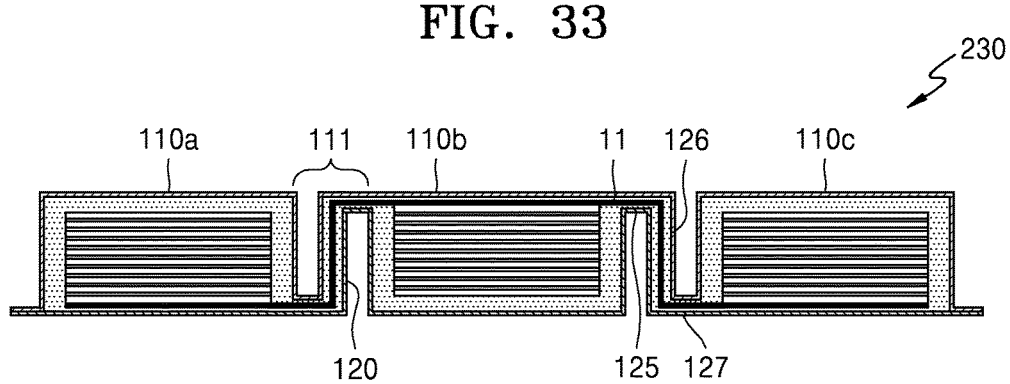

FIG. 33 is a cross-sectional view showing a structure of yet another alternative exemplary embodiment of an electrochemical device 230 according to the invention. An exemplary embodiment of the electrochemical device 230 illustrated in FIG. 33 is substantially the same as an exemplary embodiment of the electrochemical device 229 shown in FIG. 32 except that, the conductive line 11 is disposed above the electrode assembly 10 in the second accommodation portion 110b. In one exemplary embodiment, for example, the conductive line 11 may be disposed to face the lower surfaces of the electrode assemblies 10 in the first and third accommodation portions 110a and 110c. In such an embodiment, the conductive line 11 may be lead in the second accommodation portion 110b through the top region of the second accommodation portion 110b along the connecting portion 111, and then may face the upper surface of the electrode assembly 10, without being bent. In such an embodiment, the conductive line 11 may be lead in the third accommodation portion 110c through the bottom region of the third accommodation portion 110c along the connecting portion 111 and arranged to face the lower surface of the electrode assembly 10.

Figure 34:
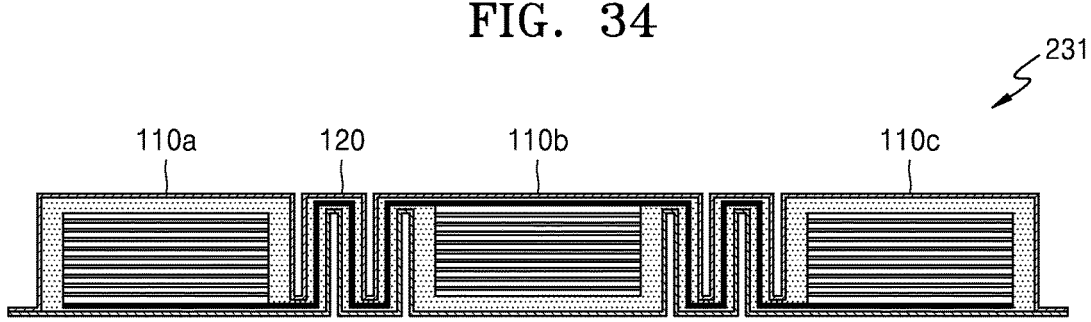

FIG. 34 is a cross-sectional view showing a structure of yet still another alternative exemplary embodiment of an electrochemical device 231 according to the invention. Referring to FIG. 34, in an exemplary embodiment, the bending portion 120 of the electrochemical device 231 may be bent by a plurality of times in a serpentine shape in a portion between a plane defined by the upper surface of the first through third accommodation portions 110a, 110b and 110c and a plane defined by the lower surface of the first through third accommodation portions 110a, 110b and 110c. The other features of structure of the electrochemical device 231 may be substantially the same as that of the electrochemical device 230 illustrated in FIG. 33. However, the structure that the bending portion 120 is bent by the plurality of times in the serpentine shape may also be applied to the electrochemical device 229 illustrated in FIG. 32.

Figure 35:
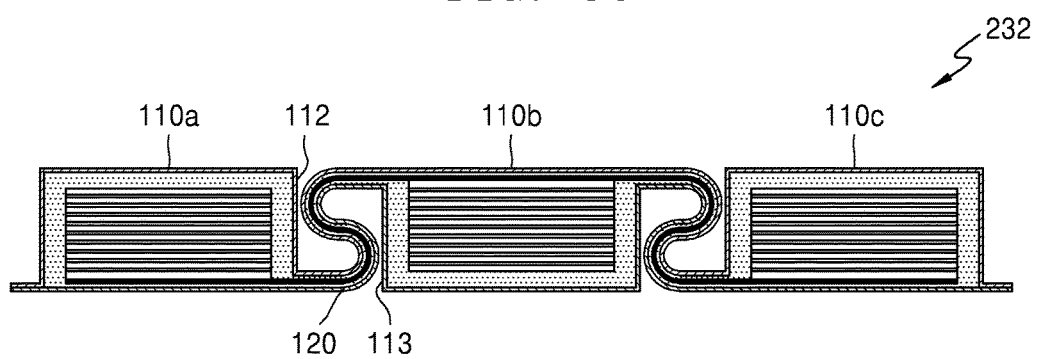

FIG. 35 is a cross-sectional view showing a structure of still another alternative exemplary embodiment of an electrochemical device 232 according to the invention. Referring to FIG. 34, in an exemplary embodiment, the bending portion 120 of the electrochemical device 232 may be bent to form an S-shaped curved line. In one exemplary embodiment, for example, the bending portion 120 between the first accommodation portion 110a and the second accommodation portion 110b may be bent in an opposite direction at a location near the second side surface 113 of the second accommodation portion 110b, and then may be bent again in an opposite direction at a location near the first side surface 112 of the first accommodation portion to extend onto the top region of the second accommodation portion 110b. The other features of the structure of the electrochemical device 232 may be substantially the same as that of the electrochemical device 230 illustrated in FIG. 33. The structure that the bending portion 120 is bent by the S-shape may also be applied to the electrochemical device 229 illustrated in FIG. 32.

Figure 36:
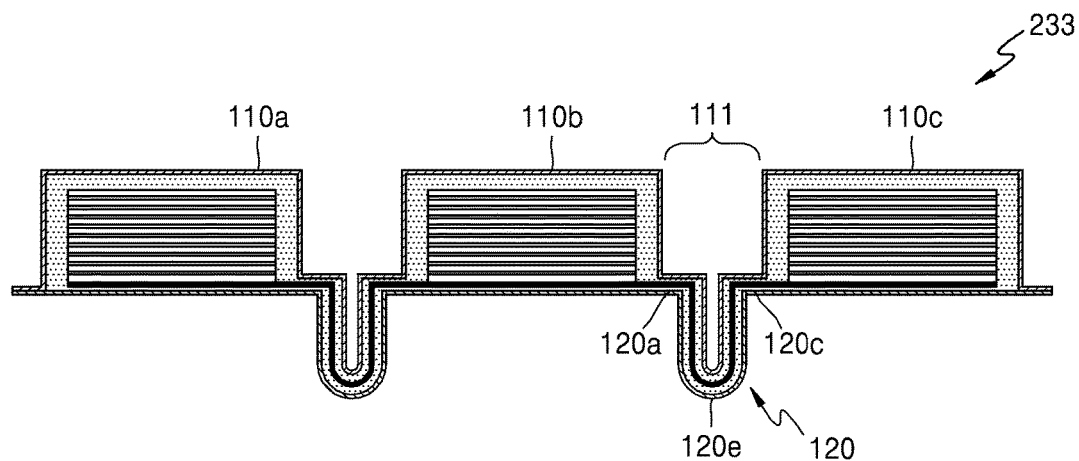

FIG. 36 is a cross-sectional view showing a structure of yet still another alternative exemplary embodiment of an electrochemical device 233 according to the invention. In an exemplary embodiments described with reference to FIGS. 1 through 35, the bending portion 120 may be disposed to face the first side surface 112 and the second side surface 113 of two adjacent accommodation portions 110a, 110b and 110c. In one exemplary embodiment, for example, the bending portion 120 is located between the lower surface and the upper surface of the accommodation portions 110a, 110b, and 110c. In an alternative exemplary embodiment, as shown in FIG. 36, the bending portion 120 of the electrochemical device 233 may be defined or formed to protrude downwards from the lower surface of the accommodation portions 110a, 110b and 110c. In one exemplary embodiment, for example, the first bent portion 120a of the bending portion 120 between the first accommodation portion 110a and the second accommodation portion 110b may extend from the bottom region of the first accommodation portion 110a, and the second bent portion 120c between the first accommodation portion 110a and the second accommodation portion 110b may extend from the bottom region of the second accommodation portion 110b. In such an embodiment, the valley portion 120e may be defined or formed between the first bent portion 120a and the second bent portion 120c to protrude downwards from the first accommodation portion 110a and the second accommodation portion 110b.

Alternatively, the bending portion 120 may protrude upwards from the upper surface of the accommodation portions 110a, 110b and 110c. In one exemplary embodiment, for example, the first bent portion 120a of the bending portion 120 between the first accommodation portion 110a and the second accommodation portion 110b may extend from the top region of the first accommodation portion 110a, and the second bent portion 120b between the first accommodation portion 110a and the second accommodation portion 110b may extend from the top region of the second accommodation portion 110b. In such an embodiment, the ridge portion 120b between the first bent portion 120a and the second bent portion 120c may protrude upwards from the first accommodation portion 110a and the second accommodation portion 110b.

Figure 37:
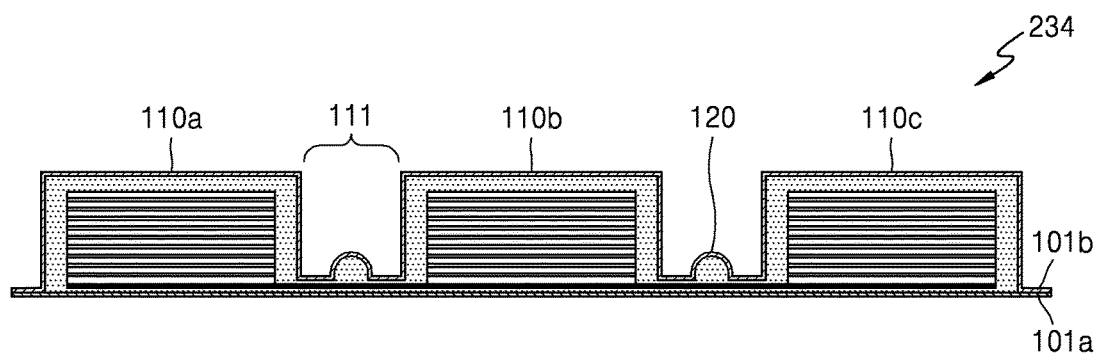

FIG. 37 is a cross-sectional view showing a structure of still another alternative exemplary embodiment of an electrochemical device 234 according to the invention. In exemplary embodiments described above with reference to FIGS. 1 through 36, the lower casing member 101a and the upper casing member 101b may be bent in substantially the same manner in the connecting portion 111, and the lower casing member 101a and the upper casing member 101b may collectively define or form the bending portion 120. In such an embodiment, the lower casing member 101a and the upper casing member 101b in the connecting portion 111 may be substantially parallel to each other. In such embodiments, a thickness of the connecting portion 111 may be substantially uniform or maintained constantly. In an alternative exemplary embodiment, only one of the lower casing member 101a and the upper casing member 101b may be bent in the connecting portion 111 to define or form the bending portion 120, or degrees in which the lower casing member 101a and the upper casing member 101b are bent may be different. In one exemplary embodiment, for example, referring to FIG. 37, only the upper casing member 101b protrudes upwards to be bent, thereby defining or forming the bending portion 120, and the lower casing member 101a may be maintained to be flat. In such an embodiment, a distance between the lower casing member 101a and the upper casing member 101b in the bending portion 120, that is, the thickness of the connecting portion 111, may vary, e.g., increase.

Figure 38:
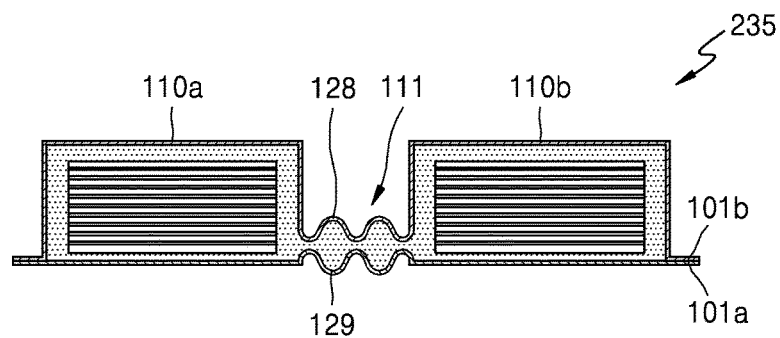

FIG. 38 is a cross-sectional view showing a structure of yet still another alternative exemplary embodiment of an electrochemical device 235 according to the invention. Referring to FIG. 38, in an exemplary embodiment, the upper casing member 101b may be bent by a plurality of times as a wave shape in the connecting portion 111 to form a first bending portion 128, and, the lower casing member 101a may be bent by a plurality of times as a wave shape in the connecting portion 111 to defined or form a second bending portion 129 such that the lower casing member 101a and the upper casing member 101b are bent independently from each other.

Figure 39:
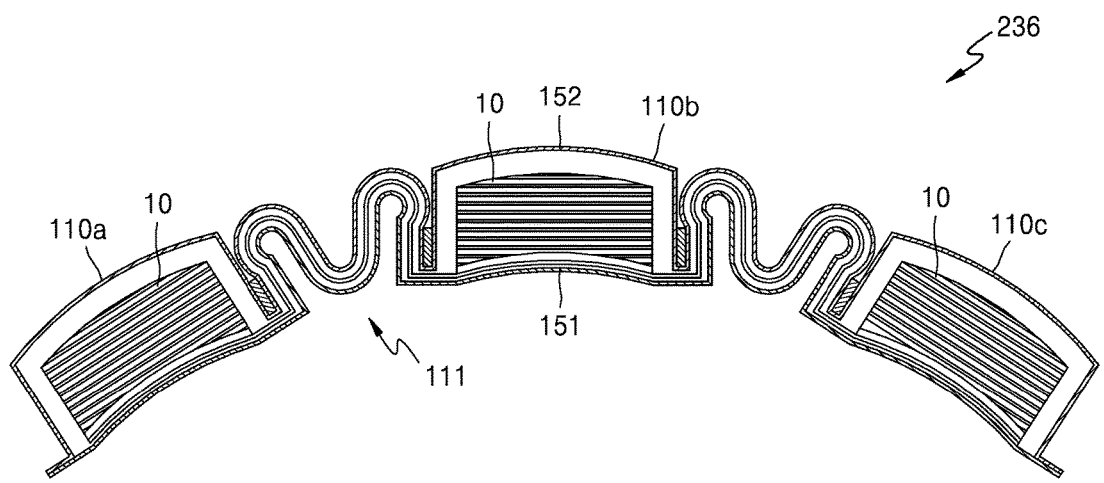

FIG. 39 is a cross-sectional view showing a structure of still another alternative exemplary embodiment of an electrochemical device 236 according to the invention. Referring to FIG. 39, in an exemplary embodiment, curved surfaces 151 and 152 may be defined or formed on the lower surface or the upper surface of the plurality of accommodation portions 110a, 110b and 110c, respectively. In an exemplary embodiment, as illustrated in FIG. 39 that the curved surfaces 151 and 152 are defined or formed on both of the lower surface and the upper surface, but not being limited thereto. In an alternative exemplary embodiment, the curved surface 151 or 152 may be defined or formed only on either the lower surface or the upper surface. Not only on the lower surface and the upper surface of the accommodation portions 110a, 110b and 110c, but also on a lower surface and an upper surface of the plurality of electrode assemblies 10, which are arranged in the accommodation portions 110a, 110b and 110c, respectively, may the curved surface be formed.

In an exemplary embodiment, as illustrated in FIG. 39, the entire electrochemical device 236 may be curved. For example, the connecting portion 111 may be bent in a way such that the first through third accommodation portions 110a, 110b and 110c may not be arranged in a straight line and may be inclined to one another along a random curved line.

Figure 40:
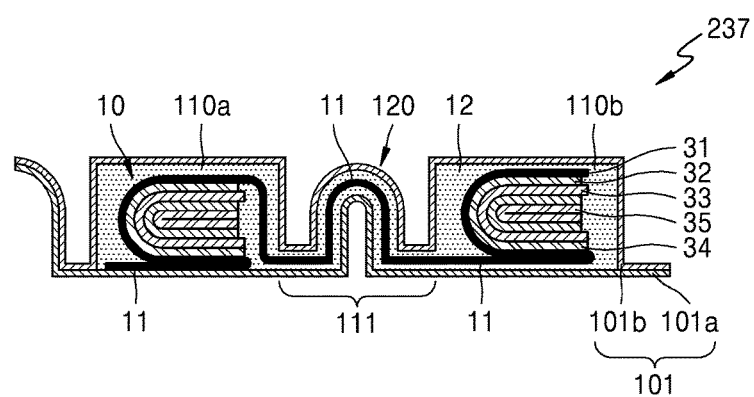

FIG. 40 is a cross-sectional view showing a structure of still another alternative exemplary embodiment of an electrochemical device 237 according to the invention. Referring to FIG. 40, each of the electrode assemblies 10 may comprise a first current collector 31, a first active material layer 32 coated on the first current collector 31, a separator 33, a second current collector 34, and a second active material layer 35 coated on the second current collector 34. For example, the first current collector 31 may be a positive current collector, and the first active material layer 32 may be formed by mixing a positive active material, a conductive agent, and a binder. Also, the second current collector 34 may be a negative current collector, and the second active material layer 35 may be formed by mixing a negative active material, a conductive agent, and a binder. The separator 33 may electrically separate the first current collector 31 and first active material layer 32 from the second current collector 34 and the second active material layer 35.

The conductive line 11 electrically connecting the plurality of electrode assemblies 10 may be integrally formed with the first current collector 31. For example, after coating the first active material layer 32 on a portion of a metal foil, the separator 33, the second current collector 34, and the second active material layer 35 may be sequentially formed on the first active material layer 32. Then, the electrode assemblies 10 may be formed by bending or folding the first active material layer 32, the separator 33, the second current collector 34 and the second active material layer 35 together with the portion of the metal foil. In the metal foil, the portion on which the first active material layer 32 is coated may be the first current collector 31 and the other portion may be the conductive line 11.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrochemical device comprising:
   a first electrode assembly;
   a second electrode assembly adjacent to the first electrode assembly and spaced apart from the first electrode assembly;
   a casing member which packages the first and second electrode assemblies, wherein the casing member comprises:
      a first accommodation portion which accommodate the first electrode assembly;
      a second accommodation portion which accommodates the second electrode assembly; and
      a connecting portion which connects the first and second accommodation portions to each other; and
   electrolytes disposed in the first and second accommodation portions,
   wherein a thickness of the connecting portion is less than a thickness of the first and second accommodation portions, and
   the connecting portion is bent defining a curved bending portion,
   wherein the casing member further comprises:
      a lower casing member disposed at a bottom surface of the first and second electrode assemblies; and
      an upper casing member disposed above the first and second electrode assemblies,
   wherein the lower casing member and the upper casing member collectively define the first accommodation portion, the second accommodation portion and the connecting portion,
   wherein
   a space surrounding the curved bending portion is divided into a first space and a second space, which are on opposite sides to each other with respect to the curved bending portion,
   a center of curvature of each point on the curved bending portion is located in one of a direction of the first space and a direction of the second space, and
   the curved bending portion has a bending direction conversion point at which a location of the center of curvature is changed from the direction of the first space to the direction of the second space, or from the direction of the second space to the direction of the first space, and
   wherein a portion of the lower casing member corresponding to the curved bending portion has a substantially same shape as a portion of the upper casing member corresponding to the curved bending portion.

2. The electrochemical device of claim 1, wherein
   an inner space is defined in the connecting portion, and
   the inner space of the connecting portion is defined by a portion of the lower casing member and a portion of the upper casing member which collectively define the connecting portion, such that the electrolytes are transported between the first and second accommodation portions.

3. The electrochemical device of claim 1, wherein the lower casing member and the upper casing member are integrally formed as a single unitary.

4. The electrochemical device of claim 1, further comprising:
a sealing member which seals an inner portion of the connecting portion such that the electrolytes respectively disposed in the first and second accommodation portions are isolated from each other.

5. The electrochemical device of claim 1, further comprising:
a conductive line which electrically connects the first and second electrode assemblies to each other,
wherein the conductive line extends between the first and second accommodation portions through an inner space of the connecting portion, and is bent in the connecting portion to have substantially the same shape as the curved bending portion of the connecting portion.

6. The electrochemical device of claim 1, wherein
the connecting portion is connected between a bottom region of a side surface of the first accommodation portion and a bottom region of a side surface of the second accommodation portion, and
the side surface of the first accommodation portion faces the side surface of the second accommodation portion.

7. The electrochemical device of claim 6, wherein
the curved bending portion comprises:
a first bent portion bent in a way such that the connecting portion faces the side surface of the first accommodation portion:
a second bent portion bent in a way such that the connecting portion faces the side surface of the second accommodation portion; and
a ridge portion connected between the first bent portion and the second bent portion,
wherein a center of curvature of the first and second bent portions is on an opposite side to a center of curvature of the ridge portion.

8. The electrochemical device of claim 7, wherein a highest surface of the connecting portion facing the center of curvature of the ridge portion, is higher than a lowest surface of the connecting portion facing the center of curvature of the first and second bent portions.

9. The electrochemical device of claim 7, further comprising:
at least one of a first fixing member and a second fixing member,
wherein
the first fixing member is disposed between the first accommodation portion and the first bent portion and fixes the first bent portion to the side surface of the first accommodation portion, and
the second fixing member is disposed between the second accommodation portion and the second bent portion and fixes the second bent portion to the side surface of the second accommodation portion.

10. The electrochemical device of claim 7, further comprising:
a fixing member which is fixed to support an inside surface of the ridge portion,
wherein the inside surface of the ridge portion faces the center of curvature of the ridge portion.

11. The electrochemical device of claim 7, wherein the ridge portion is bent in a way such that the ridge portion protrudes above upper surfaces of the first and second accommodation portions to face at least a portion of the upper surface of the first accommodation portion or at least a portion of the upper surface of the second accommodation portion.

12. The electrochemical device of claim 6, wherein the curved bending portion is formed to protrude downwards from lower surfaces of the first and second accommodation portions.

13. The electrochemical device of claim 6, wherein the curved bending portion comprises:
a first bent portion bent in a way such that the connecting portion faces the first side surface of the first accommodation portion;
a second bent portion bent in a way such that the connecting portion faces the second side surface of the second accommodation portion;
a plurality of ridge portions defined between the first bent portion and the second bent portion; and
a valley portion defined between the ridge portions.

14. The electrochemical device of claim 1, wherein
the connecting portion is connected between a bottom region of a side surface of the first accommodation portion and a top region of a first side surface of the second accommodation portion, and
the side surface of the first accommodation portion faces the first side surface of the second accommodation portion.

15. The electrochemical device of claim 14, further comprising:
a third electrode assembly spaced apart from the second electrode assembly,
wherein the casing member further comprises a third accommodation portion which accommodates the third electrode assembly and is filled with the electrolytes, and
the connecting portion connects between a top region of a second side surface of the second accommodation portion and a bottom region of a side surface of the third accommodation portion,
wherein the second side surface of the second accommodation portion faces the side surface of the third accommodation portion.

16. The electrochemical device of claim 14, further comprising:
a conductive line which electrically connects the first and second electrode assemblies,
wherein the conductive line extends between the first and second accommodation portions through an inner space of the connecting portion and is disposed to face a bottom surface of the first and second electrode assemblies in the casing member.

17. The electrochemical device of claim 14, further comprising:
a conductive line which electrically connects the first and second electrode assemblies,
wherein the conductive line extends between the first and second accommodation portions through an inner space of the connecting portion and is disposed to face a bottom surface of the first electrode assembly and a top surface of the second electrode assembly in the casing member.

18. The electrochemical device of claim 14, wherein the curved bending portion is bent a plurality of times in a serpentine shape in a region between upper surfaces of the first and second accommodation portions and lower surfaces of the first and second accommodation portions.

19. The electrochemical device of claim 1, wherein a length of the connecting portion is 1.5 times greater than a straight line distance between the first accommodation portion and the second accommodation portion.

20. The electrochemical device of claim 1, wherein the curved bending portion has a plurality of bending direction conversion points such that the curved bending portion is bent a plurality of times.

21. The electrochemical device of claim 1, wherein a curved surface is defined on at least one of an upper surface of the first accommodation portion, a lower surface of the first accommodation portion, an upper surface of the second accommodation portion and a lower surface of the second accommodation portion.

22. The electrochemical device of claim 1, wherein the connecting portion is bent in a way such that the first accommodation portion and the second accommodation portion are inclined with respect to each other.

* * * * *